United States Patent [19]

Arisaka et al.

[11] 4,258,990
[45] Mar. 31, 1981

[54] PROGRAM TYPE ELECTRIC SHUTTER PROVIDED WITH EXPOSURE WARNING INDICATING DEVICE

[75] Inventors: Kunio Arisaka, Urawa; Kenta Namioka, Tokyo, both of Japan

[73] Assignee: Copal Company Limited, Tokyo, Japan

[21] Appl. No.: 31,966

[22] Filed: Apr. 20, 1979

[30] Foreign Application Priority Data

Apr. 21, 1978 [JP] Japan .................................. 53/46671
Jun. 29, 1978 [JP] Japan .................................. 53/79042

[51] Int. Cl.³ ............................................. G03B 7/091
[52] U.S. Cl. ..................................... 354/29; 354/60 L; 354/354
[58] Field of Search ................... 354/26, 29, 30, 60 E, 354/60 L, 230, 273, 53, 59, 42, 49, 354

[56] References Cited

U.S. PATENT DOCUMENTS

| | | | |
|---|---|---|---|
| 3,950,767 | 4/1976 | Matsui | 354/60 L |
| 4,095,243 | 6/1978 | Numata | 354/60 L |
| 4,112,443 | 9/1978 | Iguchi | 354/60 L |

Primary Examiner—L. T. Hix
Assistant Examiner—S. D. Schreyer
Attorney, Agent, or Firm—Cushman, Darby & Cushman

[57] ABSTRACT

A program type electric shutter wherein a shutter blade which is also a diaphragm blade and is made to be able to latch an exposure warning indicating device to be inoperative just before the beginning of the opening of the shutter blade and a diaphragm device which can open and close a window for a light receiving element are operatively connected with each other in order to prevent the mis-indication of the exposure warning indicating device. This electric shutter is provided with an electric self-timer device and a flash controlling circuit.

3 Claims, 24 Drawing Figures

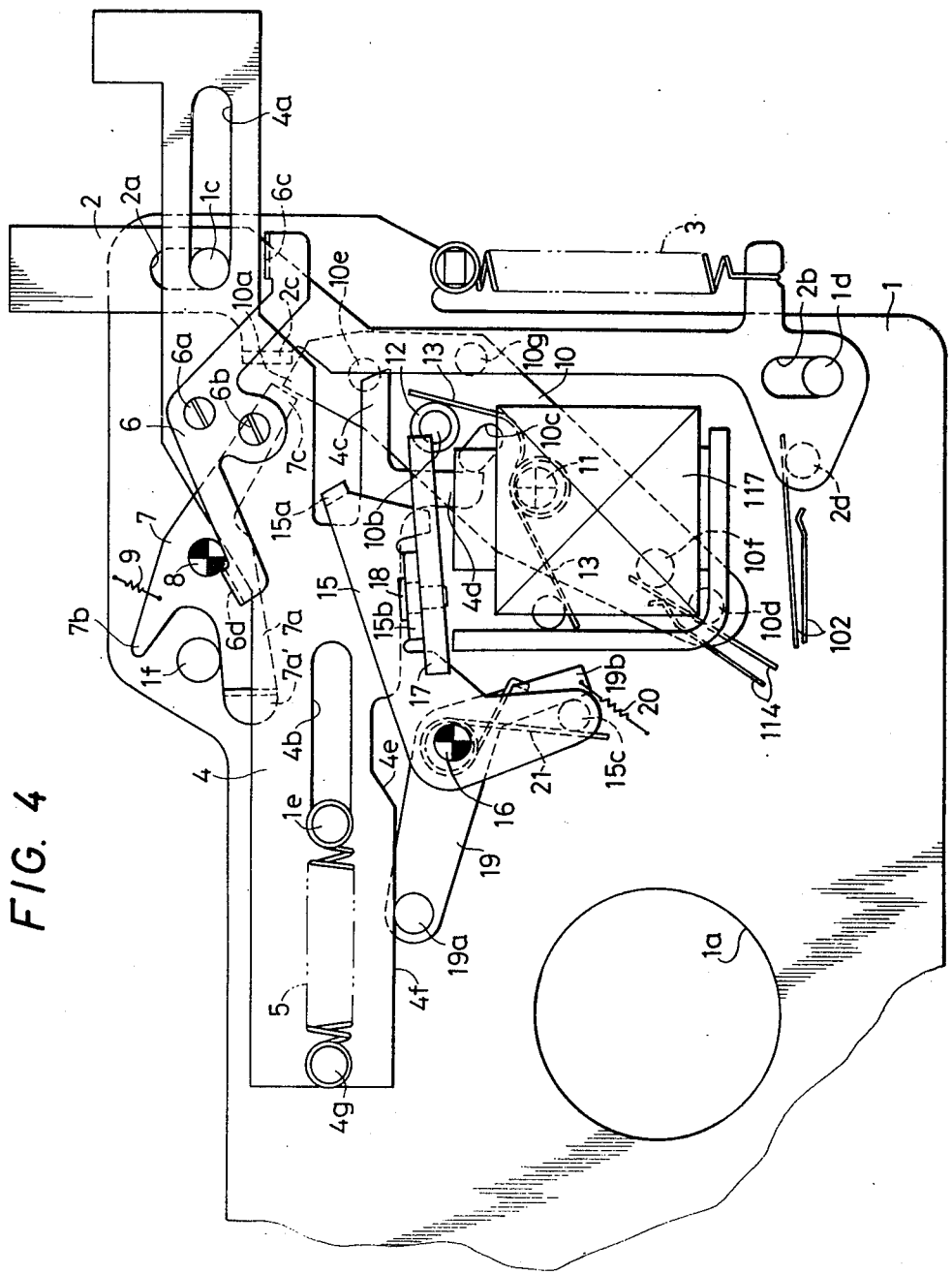

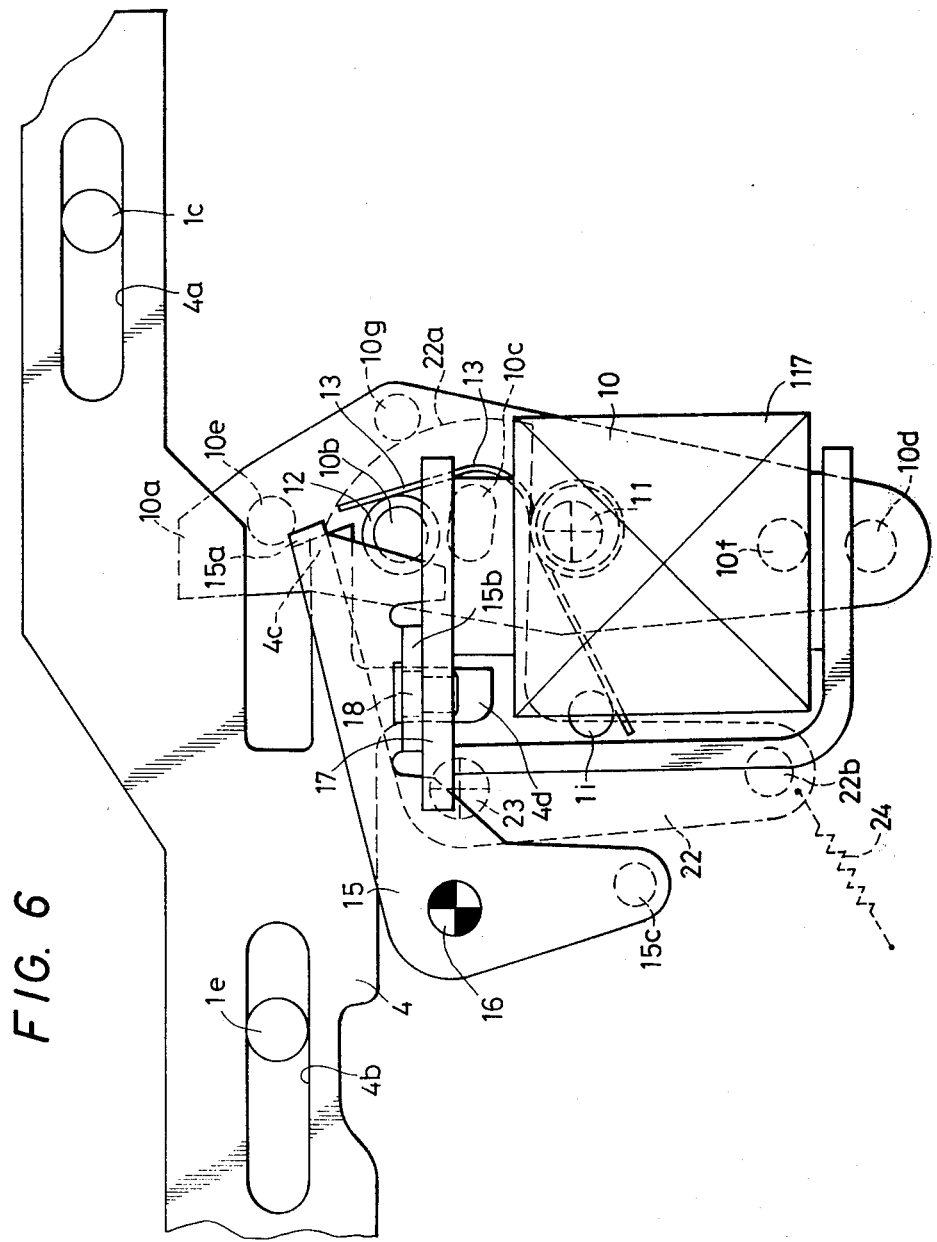

PROGRAM TYPE ELECTRIC SHUTTER PROVIDED WITH EXPOSURE WARNING INDICATING DEVICE

BACKGROUND OF THE INVENTION (a) Field of the Invention

This invention relates to improvements of an exposure warning indicating device adapted to a program type electric shutter of a type wherein a shutter blade which is also a diaphragm blade and a diaphragm device for a light receiving element are controlled as operatively connected with each other.

(b) Description of the Prior Art

There is already known a program type electric shutter so formed that a diaphragm device for a light receiving element operatively connected with shutter blades which are also diaphragm blades may be opened in the normal state to warn the exposure but may be once closed and then again opened in response to the opening of the shutter blade when the shutter is released. In this kind of conventional program type electric shutter, as the diaphragm device for the fully opened light receiving element is once closed and then again opened by the shutter release, the light from the object to be photographed incident upon the light receiving element will be once interrupted in the process of the shutter release as a result. Therefore, there has been a defect that the warning device informing that the object is so dark that there is a danger of a camera-shake will work for a moment to give wrong information to the operator.

SUMMARY OF THE INVENTION

An object of the present invention is to eliminate the above mentioned defect in this kind of program type electric shutter.

According to the present invention, this object is attained in a manner wherein the exposure warning indicating device is once made operative by the initial operation of the shutter button and is then latched to be inoperative.

According to a preferred formation of the present invention, the exposure warning indicating device is latched to be inoperative by an electric signal issued when the diaphragm device for the light receiving element once closes the light receiving window.

According to another formation of the present invention, the exposure warning incicating device is latched to be inoperative by an electric signal issued when the operation of such time delaying device as a self-timer started by the initial operation of the shutter button ends.

This and other objects of the present invention will become more apparent during the course of the following detailed description and appended claims.

BRIEF DESCRIPTION OF THE DRAWINGS

FIG. 4 is an elevational view showing the shutter shown in FIG. 1 as the exposure ends;

FIGS. 6 to 10 are elevational views showing respectively different operating positions of the shutter opening and closing mechanism parts at the time of flash photographing;

DESCRIPTION OF THE PREFERRED EMBODIMENTS

Figure 1:
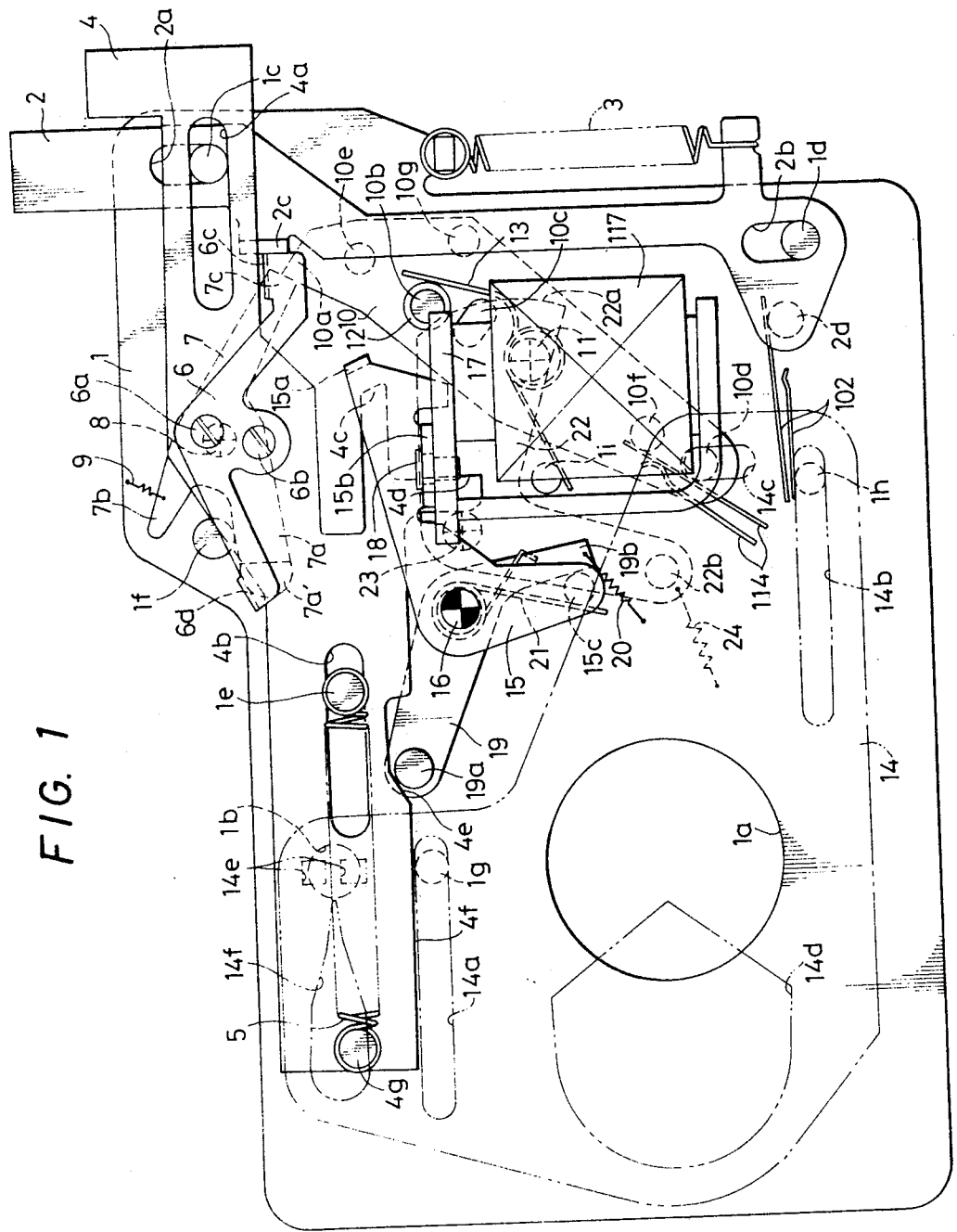
FIG. 1 is an elevational view showing basic mechanism parts of a shutter device according to the present invention as cocked.
Figure 2:
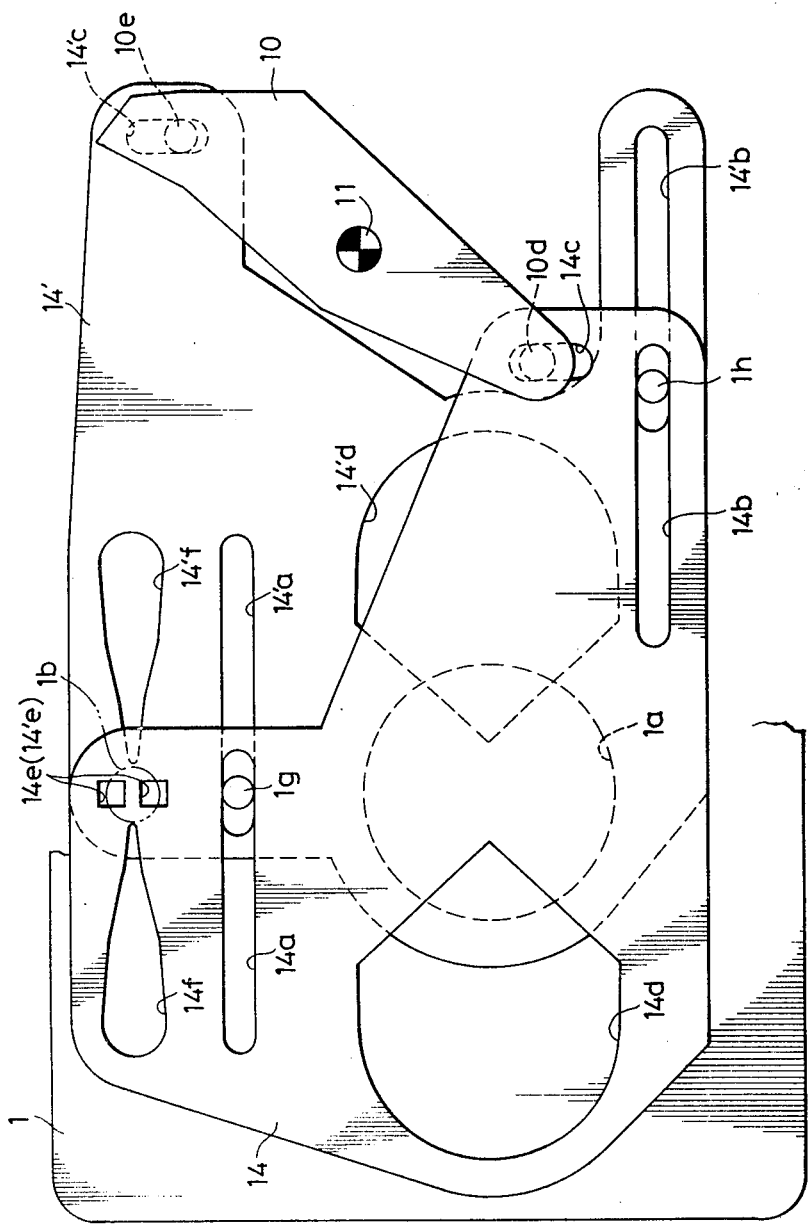
FIG. 2 is an elevational view showing the correlation of a pair of shutter blades.

First, with reference to FIGS. 1 to 9, reference numeral 1 indicates a shutter plate which forms an exposure aperture 1a and light receiving window 1b and has pins 1d, 1e, 1f, 1g, 1h and 1i erected on it. 2 indicates a release plate which forms slots 2a and 2b fitting respectively the pins 1c and 1d, forms a bend 2c, has a pin 2d erected on it and is biased upward by a spring 3. 4 indicates a closing drive plate which forms slots 4a and 4b fitting respectively the pins 1c and 1e, forms arms 4c and 4d, a slope 4e and a flat surface 4f, has a pin 4g erected on it and is biased rightward by a spring 5 connected between the pins 1e and 4g. 6 indicates a plate spring member which is secured on the closing drive plate 4 by screws 6a and 6b, forms bends 6c and 6d projecting on the back surface side of the closing drive plate 4 at both ends as clearly shown in FIG. 4 and is inclined along the lower end edges 6c' and 6d' of the respective bends 6c and 6d. The bend 6c is engageable with the bend 2c of the release plate 2. Reference numeral 7 indicates a shutter release lever which is pivoted to a shaft 8, forms arms 7a and 7b engageable with the pin 1f, forms another arm 7c, is bent at the tip 7a' of the arm 7a so as to be positioned within the moving track of the bend 6d and is biased clockwise by a spring 9 so that the arm 7 may engage in contact with the pin 1f. 10 indicates an opening and closing lever which is borne on a shaft 11, has an arm 10a engageable with the arm 7c and has a nonconductive pin 10b, a projection 10c and pins 10d, 10e, 10f and 10g. 12 indicates a conductive ring fitted to the pin 10b. 13 indicates a spring serving also as a lead wire, connected between the pin 1i and conductive ring 12 and biasing the opening and closing lever 10 counter-clockwise. The arm 4d of the closing drive plate 4 is engageable with the conductive ring 12 and projection 10c of the opening and closing lever 10 so that a flash synchronizing switch may be formed of the arm 4d and conductive ring 12. Reference numeral 14 indicates a shutter blade which is also a diaphragm blade shown as one of a set of two, forms slots 14a and 14b fitting respectively the pins 1g and 1h and a slot 14c fitting the pin 10d and forms a shutter opening 14d, a first opening 14e which leads the light from an object to be photographed to detect the brightness of the object and a second opening 14f which leads the light from the object to determine an exposure time. As shown in FIG. 2, the other shutter blade 14' is so formed that, when the first opening 14'e coincides with the opening 14e of the shutter blade 14 (at the time of the cocked state), the shutter opening 14'd and second opening 14'f may be positioned symmetrically on the right and left respectively with those of the shutter blade 14. Further, the slot 14'c corresponding to the slot 14c fits the pin 10e. A later described light receiving element is arranged as opposed to the light receiving window 1b and can receive the light of the field to be photographed through the opening 14e or 14f. Reference numeral 15 indicates an armature lever which is pivoted to a shaft 16, forms a bend 15a capable of locking the arm 4c and another bend 15b and has a pin 15c erected on it. 17 indicates an armature borne on the bend 15b by a pin 18. 19 indicates a holding lever which is borne on the shaft 16, has a pin 19a engageable with the slope 4e and flat surface 4f erected on it, forms an arm 19b engaging with the pin 15c and is biased clockwise by a spring 20. Reference numeral 21 indicates a spring hung between the armature lever 15 and holding lever 19 and acting so that the pin 15c and arm 19b may engage with each other. 22 indicates a flash photographing opening regulating lever which is borne on a shaft 23, forms a cam surface 22a engageable with the pin 10g, has a pin 22b movable by a distance adjusting member of a camera not illustrated and is biased clockwise by a spring 24. Further, an upper base plate and lower base plate not illustrated are set at a slight spacing above and below the shutter blade 1. The shutter blade 14 is arranged between the lower base plate and shutter plate 1. The opening regulating lever 22 is arranged on the back side of the lower base plate and the other members are arranged between the shutter plate 1 and the upper base plate. Therefore, the pins 10d and 10e of the opening and closing lever 10 project on the back side of the shutter plate 1 through it and pin 10g projects to the back side of the lower base plate through the shutter plate 1 and lower base plate. By the way, slots allowing the motions of the pins 10d, 10e and 10g are formed on the shutter plate 1 and lower base plate but are omitted in the drawing. Further, the shutter plate 1, closing drive plate 4 and opening and closing lever 10 may be formed integrally with the pins and shafts located on them with a resin or the like. In such case, it will be necessary to make electric connection possible by pasting a conductive piece on the surface to be engaged with the conductive ring 12 of the arm 4d of the closing drive plate 4. Further, reference numerals 102, 114 and 117 indicate switches and an electromagnet of a later described controlling circuit. The electromagnet 117 is supported by a part not illustrated raised from the shutter plate 1 on the back side of the upper base plate so as to be arranged to be spaced from the surface of the shutter plate 1 and to be opposed to the armature 17.

Figure 19:
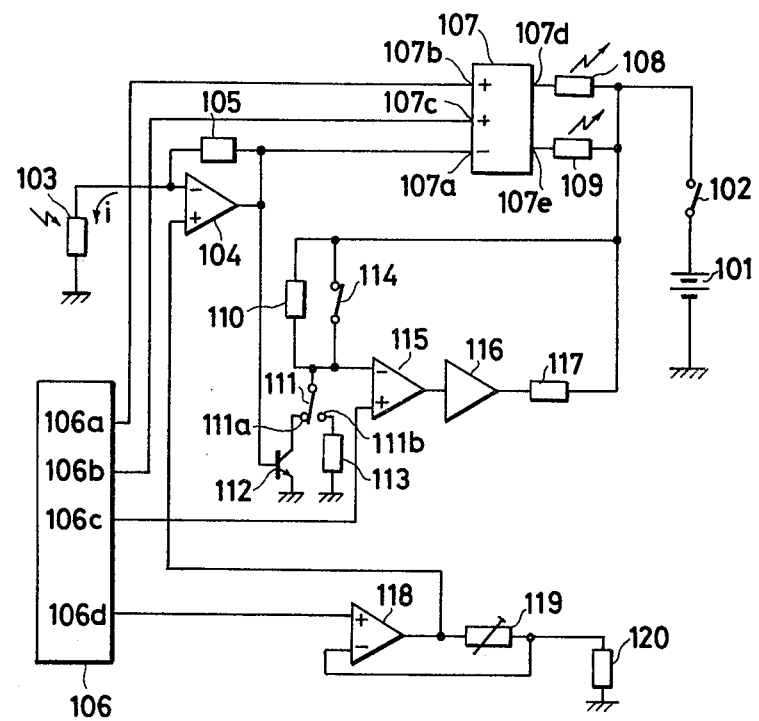
FIGS. 19 to 23 are wiring diagrams showning embodiments in which the shutter controlling circuit parts are respectively different.

The formation of the shutter controlling circuit shown in FIG. 19 shall be explained in the following as related with the above described shutter mechanism.

Reference numeral 101 indicates a current source battery earthed at the minus (−) pole. 102 indicates a current source switch opened and closed by the pin 2d of the release plate 2. 103 indicates such light receiving element as a photoelectromotive element earthed at the anode and connected at the cathode to a reversing input terminal (−) of an amplifying circuit 104. 105 indicates a logarithmic compression diode connected at the cathode to the reversing input terminal (−) of the amplifying circuit 104 and at the anode to the output terminal of the amplifying circuit. 106 indicates a reference voltage generating circuit. 107 indicates a window comparator. The reversing input terminal (−) 107a is connected to the output terminal of the amplifying circuit 104. Nonreversing input terminals (+) 107b and 107c are connected respectively to output terminals 106a and 106b of the reference voltage generating circuit. Reference numerals 108 and 109 indicates over-exposure warning and camera-shake warning LED's (which may be lamps or the like) respectively connected between the output terminals 107d and 107e of the comparator 107 and the plus pole of the current source battery 101 through the current source switch 102. Reference numeral 110 indicates an exposure time controlling capacitor which can be connected at one end to the plus pole of the current source battery 101 through the current source switch 102 and at the other end to a collector of a transistor 112 or a resistor 113 through a switching switch 111. The base of the transistor 112 is connected to the output terminal of the amplifying circuit 104. Reference numeral 114 indicates an exposure time measurement beginning switch which is connected in parallel with the capacitor 110 and can be opened and closed by the pin 10f of the opening and closing lever 10. 115 indicates a comparator connected at the nonreversing input terminal (+) to the output terminal 106c of the reference voltage generating circuit 106 and at the reversing input terminal (−) to the other end of the capacitor 110. 116 indicates an amplifying circuit connected to the output terminal of the comparator 115. The electromagnet 117 is connected between the amplifying circuit 116 and the plus pole of the current source battery 101 through the current source switch 102. 118 indicates an amplifying circuit connected at the nonreversing input terminal (+) to the output terminal 106d of the reference voltage generating circuit 106 and at the output terminal to the nonreversing input terminal (+) of the amplifying circuit 104. 119 indicates a variable resistor connected between the output terminal and the reversing input terminal (−) of the amplifying circuit 118. 120 indicates a resistor connected at one end to the joint of the reversing input terminal (−) of the amplifying circuit 118 and the variable resistor 119 and earthed at the other end.

The operation of this embodiment shall be explained in the following with reference to FIGS. 1 to 10 and 19.

First of all, the warning operation shall be described. When the release plate 2 is pushed down against the tension of the spring 3, the current source switch 102 will be closed by the displacement of the pin 2d and a voltage will be fed to the respective parts of the circuit. At this time, the light receiving element 103 will be irradiated with the light from the object to be photographed passing through the light receiving window 1b and opening 14e and therefore a photoelectric current i will be generated and will be amplified by the amplifying circuit 104. As the amplifying circuit 104 has the logarithmic compression diode 105 connected between the output terminal and reversing input terminal (−) so as to return, a voltage proportional to the logarithm of the photoelectric current i will be generated at the output terminal and will be given to the reversing input terminal (−) 107a of the window comparator 107. Here, if this voltage is higher than the reference voltage for the over-exposure warning given to the nonreversing input terminal (+) 107b from the output terminal 106a of the reference voltage circuit 106, only the LED 108 connected to the output terminal 107d will be lighted. If it is lower than the reference voltage for the camera-shake warning given to the nonreversing input terminal (+) 107c from the output terminal 106b, only the LED 109 connected to the output terminal 107e will be lighted. In case the voltage given to the reversing input terminal 107a is between the above mentioned both reference voltages, that is, in case the brightness of the object to be photographed is in the range in which the proper exposure is possible neither of the LED's 108 and 109 will be lighted. By the way, the signal for the camera-shake warning is so made as to be reversed within the window comparator 107.

Figure 3:
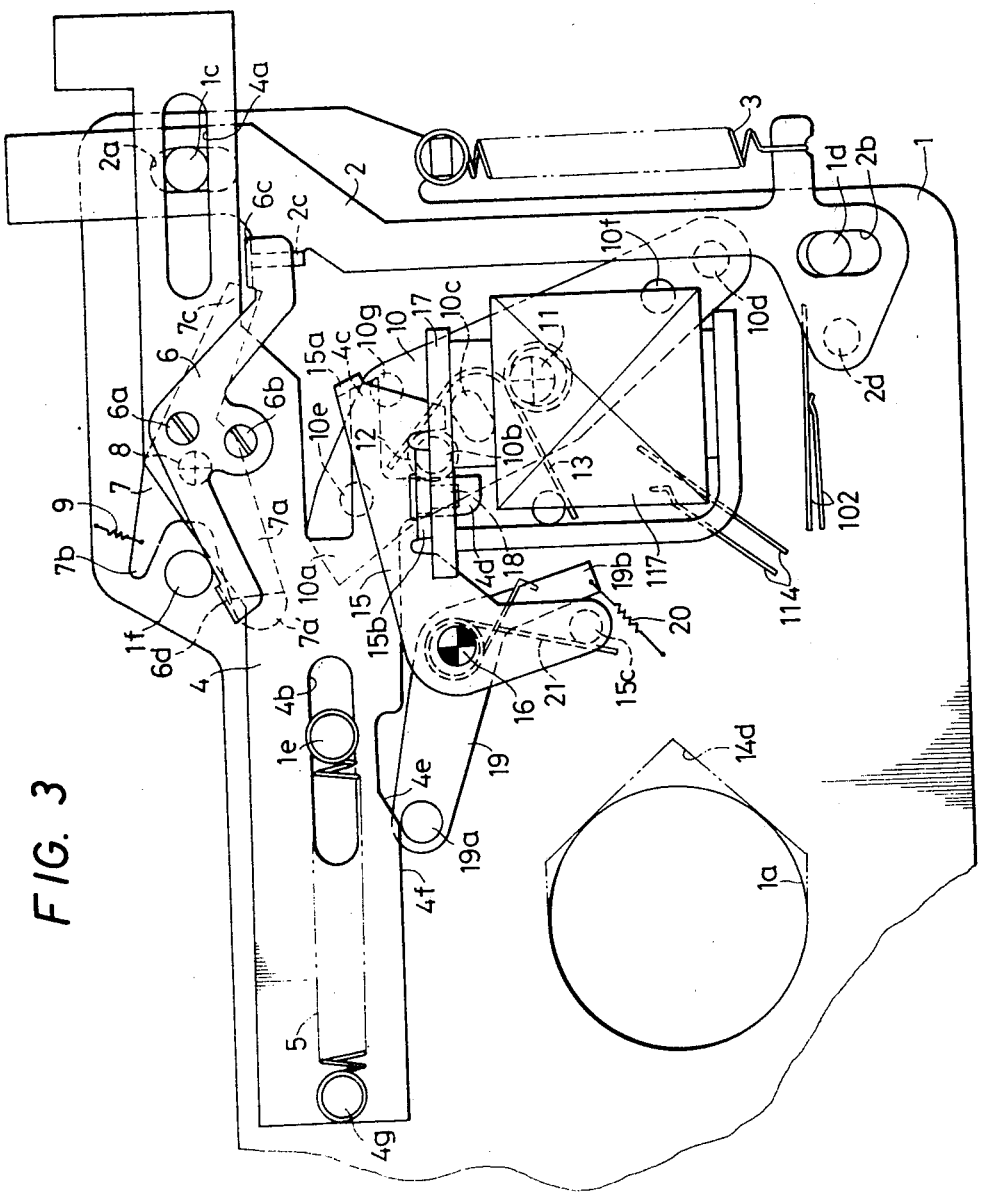
FIG. 3 is an elevational view of the case that the shutter shown in FIG. 1 is opened.

Now the automatic photographing shall be described. In this case, the switching switch 111 will be connected to the terminal 111a side as illustrated by a switching member for switching automatic photographing and flash photographing with each other provided on the camera body not illustrated, the opening regulating lever 22 will remain in the position in FIG. 1 without being moved by the distance adjusting member and the cam surface 22a will be out of the moving track of the pin 10g of the opening and closing lever 10. By the way, this switching mechanism can be also operatively connected with the operation of fitting the flashing device to the camera body or the operation of making the flashing device hop up from the camera body. As already explained, in the initial stage of the shutter release to check whether the brightness of the object to be photographed is in the proper range, the switch 114 will be closed, the reversing input terminal (−) of the comparator 115 will be placed on the potential level of the plus pole of the current source battery 101, the output terminal will be placed on the "L" level and therefore the electromagnet 117 will be excited from the beginning of the closing of the current source switch 102. Therefore, as the armature 17 is attracted by the electromagnet 117, the armature lever 15 will be held in the stage in FIG. 1. When the release lever 2 is further pushed down from this state, the bend 2c will disengage from the bend 6c of the plate spring member 6. As a result, the closing drive plate 4 will move rightward under the tension of the spring 5 and will be once stopped while the arm 4c is in contact with the bend 15a of the armature lever 15 as shown in FIG. 3. Until the closing drive plate 4 reaches this position, the slope 4e will push the pin 19a to rotate the holding lever 19 counterclockwise against the tension of the spring 20 to tension the spring 21. Further, the bend 6c of the plate spring member 6 will engage with the bend 2c of the release lever 2 to prevent the return of the release lever 2 and keep the current source switch 102 closed. On the other hand, the bend 6d will push the bend 7a' to rotate the shutter release lever 7 counterclockwise against the tension of the spring 9. By the counterclockwise rotation of the lever 7, the arm 7c will be disengaged from the arm 10a, therefore the opening and closing lever 10 will be rotated counterclockwise by the tention of the spring 13, the shutter blade 14 will be moved rightward by the pin 10d (the other shutter blade 14' will be moved leftward by the pin 10e) and the switch 114 will be opened by the displacement of the pin 10f. With the movement of the shutter blades 14 and 14', first of all, the first opening 14e will retreat from the light receiving window 1b to once shield it. However, at this time, the switch 114 will be already opened and therefore the capacitor 110 will begin to be charged with a current of a size corresponding to that of the dark current from the light receiving element 103. Then the second opening 14f will first begin to open the light receiving window 1b and a little later the shutter opening 14d will open the exposure aperture 1a. By such preliminary charging of the capacitor 110 by the dark current from the light receiving element 103 and the preceding opening of the light receiving window 1b by the opening 14f, the so-called mechanical delay will be corrected. Then, by the increase of the area of the opening 14f corresponding to the increase of the area of the shutter opening 14d, the amount of the light from the object to be photographed irradiating the light receiving element 103 will be gradually increased, the current proportional to the amount of this incident light will flow into the collector of the transistor 112 and the capacitor 110 will further continue to the charged. Thus the potential of the reversing input terminal (−) of the comparator 115 will gradually lower. Here, if a light receiving element wherein the photoelectric current becomes larger in direct proportion to the brightness of the object to be photographed is used, the amount of the collector current of the transistor 112 will be proportional to the amount of the photoelectric current and therefore the amount of light will be integrated in the capacitor 110 as a result. Further, as the openings 14d and 14f are formed on the same member and are substantially similar in the shape, it can be said that the integrated amount of the photoelectric current and the amount of the light reaching the film surface are directly proportional to each other. Therefore, if a fixed potential is given to the nonreversing input terminal (+) of the comparator 115 from the output terminal 106c of the reference voltage generating circuit 106, this potential will give a reference of the amount of exposure to the film surface so that the amount of exposure given actually to the film surface may be controlled by the comparison with the potential corresponding to the integrated amount of the photoelectric current. With the progress of the charging of the capacitor 110, when the potential of the reversing input terminal (−) of the comparator 115 becomes lower than the potential of its nonreversing input terminal (+), the comparator 115 will reverse, its output terminal will be on the "H" level and therefore the electromagnet 117 will be demagnetized. As a result, the armature lever 15 will be rotated counterclockwise by the spring 21 and will disengage the bend 15a from the arm 4c. Therefore, the closing drive lever 4 will be moved further rightward by the tension of the spring 5 as shown in FIG. 4. With this rightward movement of the closing drive lever 4, the arm 4d will first contact the conductive ring 12 and will rotate the opening and closing lever 10 clockwise against the tension of the spring 13. In the course of the rightward movement, the arm 4d of the closing drive lever 4 will engage in contact with the nonconductive projection 10c instead of the conductive ring 12 and will rotate the opening and closing lever 10 further clockwise. Therefore, as a result, the shutter blade 14 will close the exposure aperture 1a in the course of opening the exposure aperture 1a with the opening 14d or when the exposure aperture 1a is fully opend. Further, by the clockwise rotation of the opening and closing lever 10, the movable contact piece of the switch 114 will be pushed and moved by the pin 10f so as to be closed and therefore the capacitor 110 will be discharged. Further, the bend 6c of the plate spring member 6 will be disengaged from the bend 2c and therefore the release lever 2 will be returned upward by the tension of the spring 3 to open the current source switch 102 with the pin 2d. On the other hand, the bend 6d will be disengaged from the bend 7a' and therefore the shutter release lever 7 will be rotated clockwise by the tension of the spring 9 until the arm 7a contacts the pin 1f and the arm 7c will be present within the counterclockwise track of the arm 10a of the opening and closing lever 10. The shutter is cocked by moving the closing drive plate 4 leftward against the tension of the spring 5. That is to say, when the closing drive plate 4 is moved leftward from the position in FIG. 4, the plate spring member 6 will ride over the bend 2c of the release lever 2 through the slope 6c (FIG. 5) of the bend 6c, will ride over the bend 7a of the shutter release lever 7 through the slope 6d' of the other bend 6d, will run over them and will then return and the bend 6c will engage with the bend 2c. On the other hand, with the leftward movement of the closing drive plate 4, the pin 19a will move to the position of the slope 4e from the flat surface 4f as a result. Therefore, the holding lever 19 will be rotated clockwise with the armature lever 15 by the spring 20, the bend 15a will be present within the moving track of the arm 4c and the armature 17 will contact the electromagnet 117. As a result, all the members will return to the state in FIG. 1.

Figure 7:
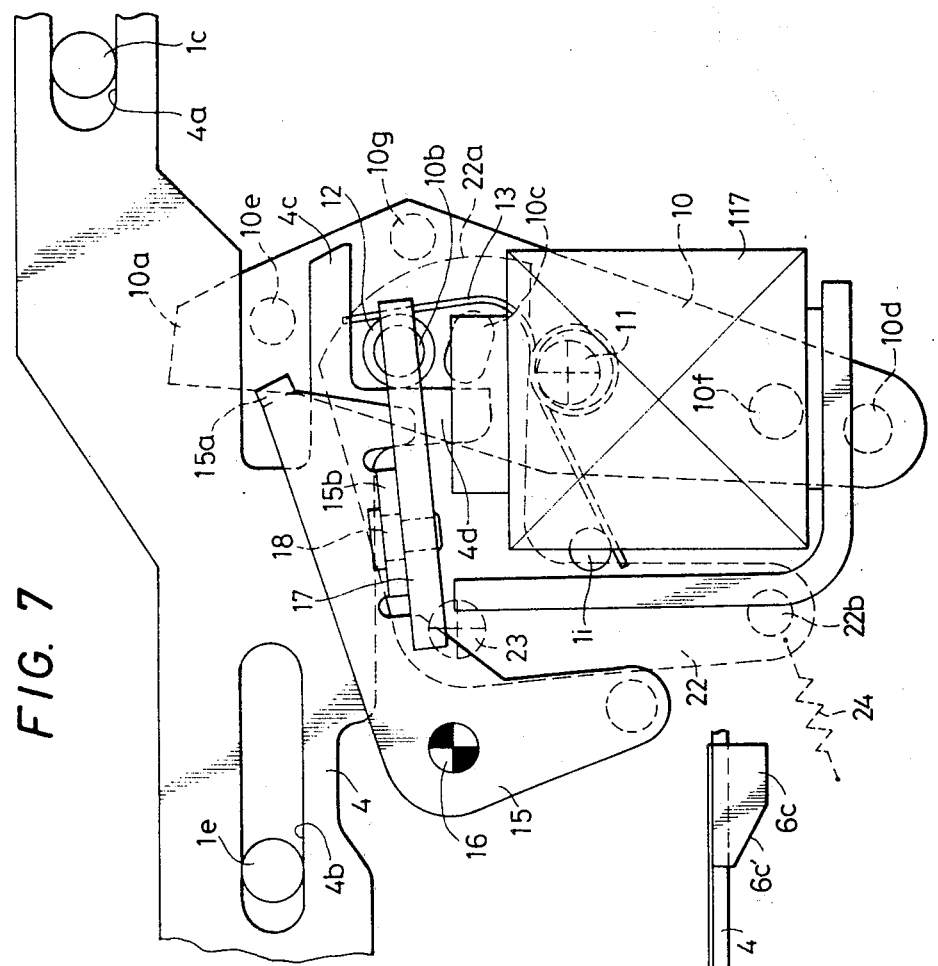
Figure 5:
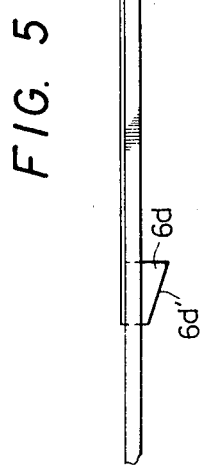
FIG. 5 is a side view showing the correlation of a closing drive plate and a plate spring member.

Now the flash photographing shall be described. By the switching operation to the flash photographing, the switching switch 111 (FIG. 19) will be connected to the terminal 111b, the resistor 113 instead of the transistor 112 will be connected to the capacitor 110 and the opening regulating lever 22 for flash photographing will become able to be operated by the distance adjusting member (not illustrated) of the camera through the pin 22b. Now, if the flash opening regulating lever 22 is rotated counterclockwise to the state in FIG. 6 as interlocked with the manual operation of the distance adjusting member, by the above described shutter releasing operation, the opening and closing lever 10 will be rotated counterclockwise until the pin 10g contacts the cam surface 22a and the exposure aperture 1a will be opened to be of a size corresponding to the photographing distance by the opening 14d of the shutter blade 14. When the electromagnet 117 is demagnetized after the lapse of a fixed delay time determined by the capacitorZ 110 and resistor 113, the same as is described above, the closing drive plate 4 will move rightward and the exposure aperture 1a will be closed by the shutter blade 14. Also, as shown in FIG. 7, when the arm 4d for beginning the closing operation of the shutter blade 14 contacts the conductive ring 12, the flash synchronizing switch will be closed and the flashing device will flash in the position of the maximum opening of the shutter blade fitted to the photographing distance. By the way, as shown in FIG. 4, at the final point of the shutter closing operation, the arm 4d will be separated from the conductive ring 12 and will be engaged with the nonconductive projection 10c and therefore the flashing device will not mis-flash.

Figure 8:
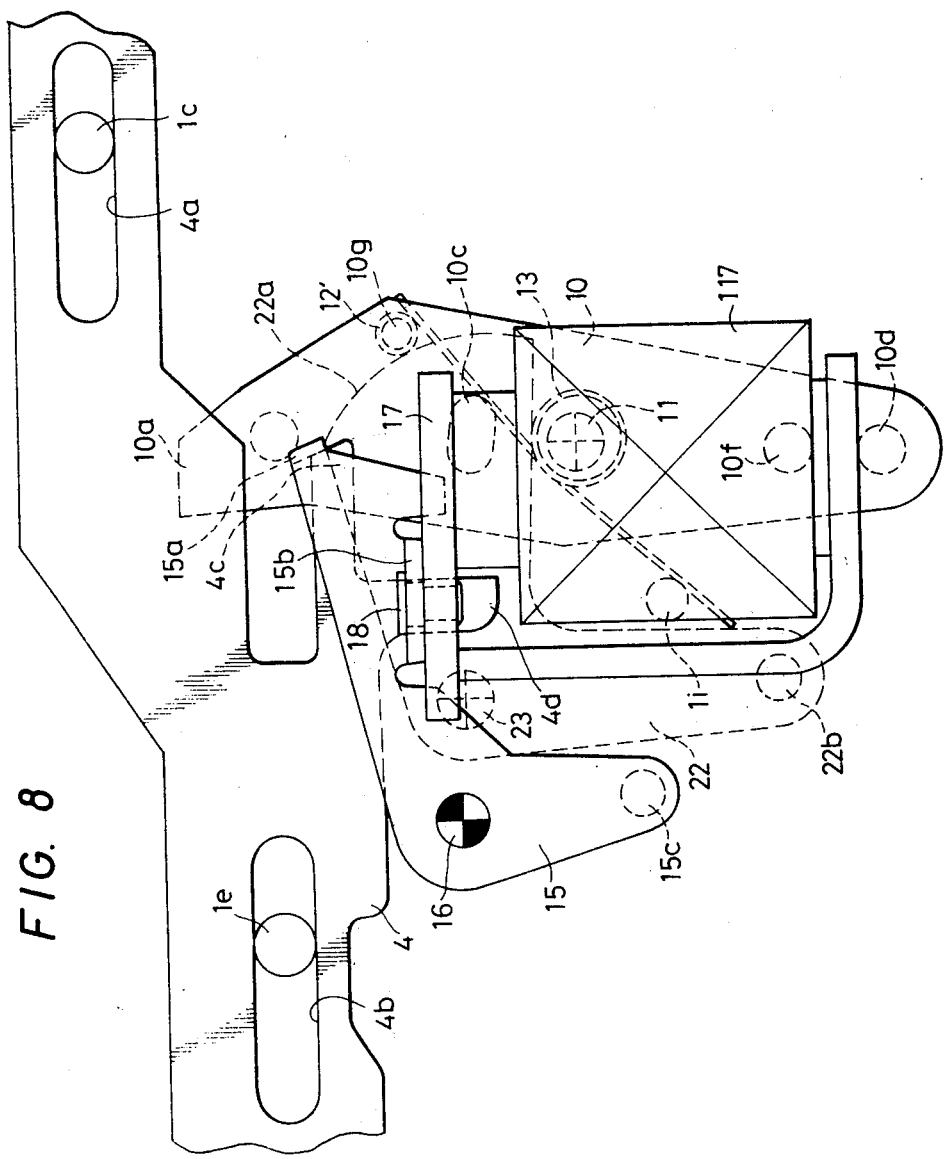

FIG. 8 shows an embodiment modified so that the flashing device may flash at the point when the opening and closing lever 10 contacts the flash opening regulating lever 22. That is to say, on the opening and closing lever 10, the pin 10b is removed, a conductive ring 12' is fitted to the pin 10g, the spring 13 is hung at one end on the conductive ring 12', the flash opening regulating lever 22 is made a conductive member and a flash synchronizing switch is formed of the cam surface 22a and conductive ring 12'.

Figure 9:
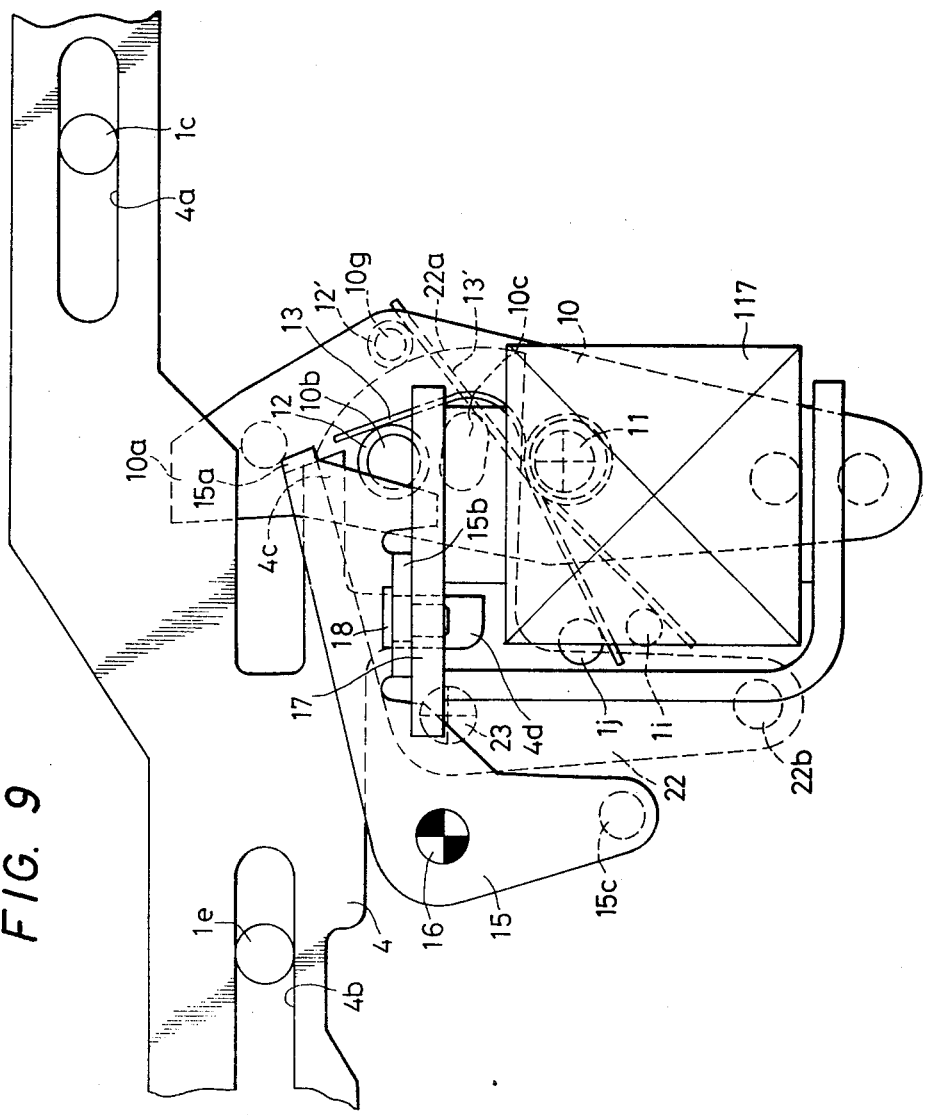
Figure 10:
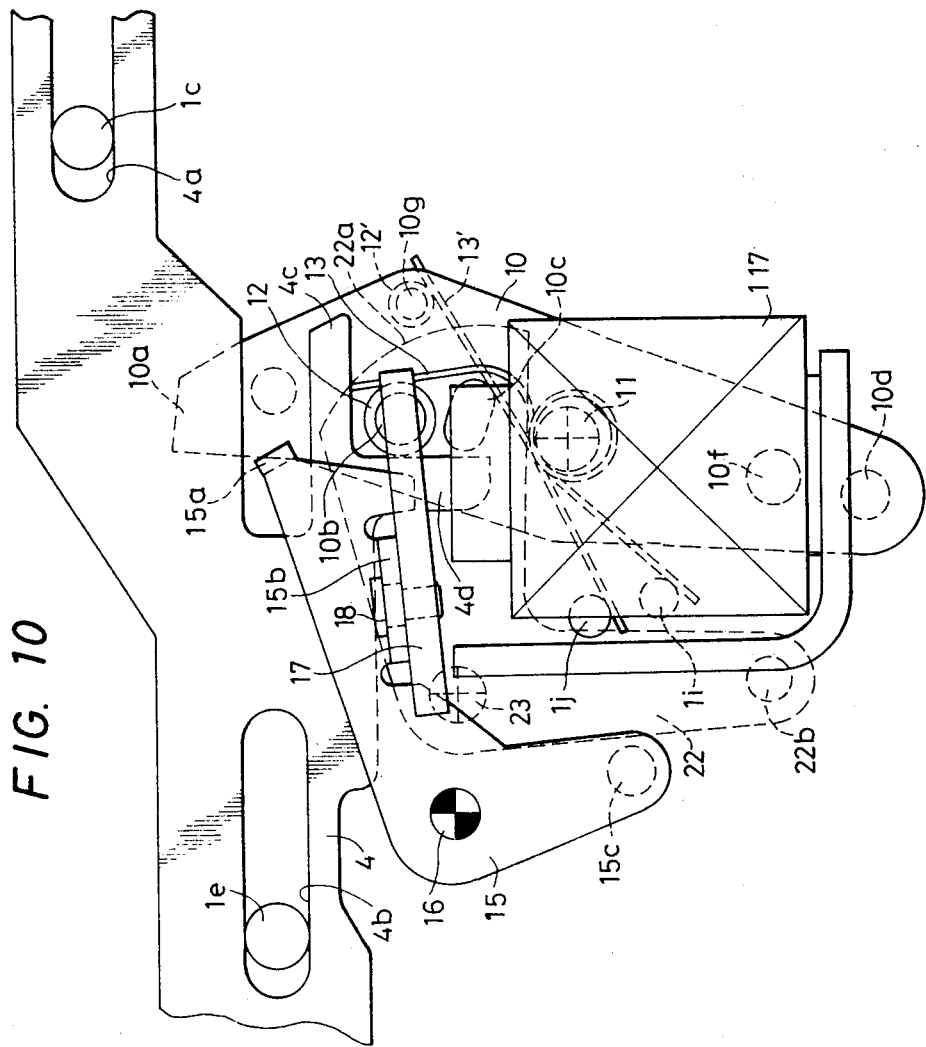
Figure 11:
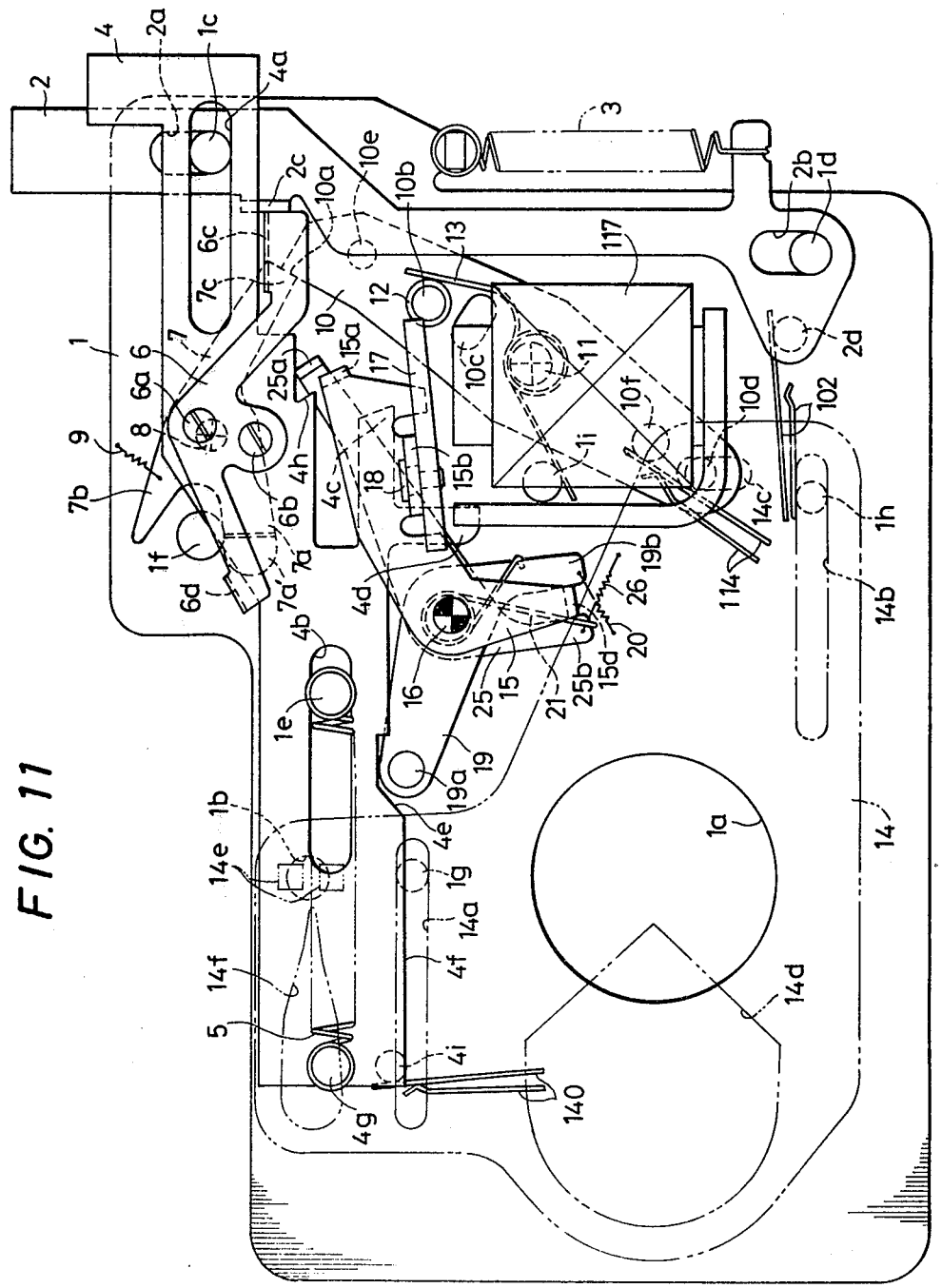
FIG. 11 is the same elevational view as in FIG. 1, showing an embodiment in which self-timer controlling elements are incorporated in the shutter device shown in FIG. 1.
Figure 12:
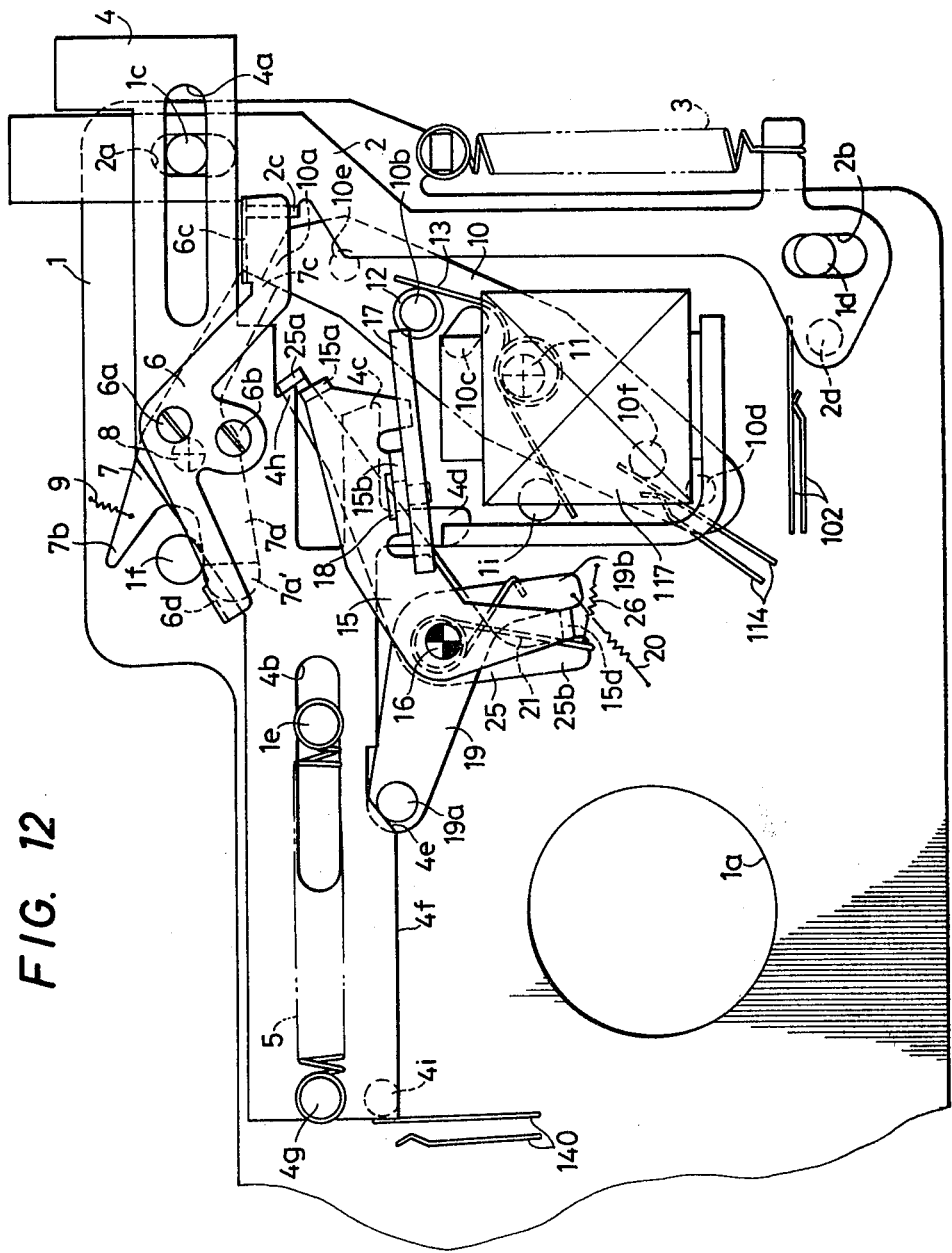
FIG. 12 is an elevational view of the shutter device shown in FIG. 11 in the case that the self-timer is in operation.

FIGS. 9 and 10 show an embodiment wherein the above mentioned flashing device is so modified as to make the flash photographing in the daytime possible. That is to say, on the opening and closing lever 10, the conductive ring 12 is fitted to the pin 10b, the conductive ring 12' is fitted also to the pin 10g and a spring 13' serving as a lead wire is hung also between the conductive ring 12' and pin 1j. A flash synchronizing switch by the conductive ring 12 and arm 4d and a flash synchronizing switch by the conductive ring 12' and cam surface 22a are connected in parallel with each other. The exposure time is made to be automatically controlled in response to the brightness of the object to be photographed in the same manner as is already explained by the circuit including the light receiving element 103, capacitor 110 and transistor 112. Therefore, in case the area of the shutter opening determined in response to the photographing distance is smaller than the area of the shutter opening determined by the brightness of the object to be photographed, as shown in FIG. 9, when the conductive ring 12' contacts the cam surface 22a, the flashing device will flash and the exposure time will be determined by the natural light and the auxiliary light by the flashing device. In case the area of the shutter opening determined in response to the photographing distance is larger than the area of the shutter opening determined by the brightness of the object to be photographed, as shown in FIG. 10, when the arm 4d contacts the conductive ring 12, the flashing device will flash. Thus the shutter opening will become the smaller diaphragm aperture to be determined in response to the brightness of the object to be photographed or the photographing distance.

By the way, FIG. 7 has been described as showing the operation of the mechanism after the state in FIG. 6 is reached. However, with only the flash synchronizing switch of a set of the arm 4d and conductive ring 12, flash photographing in the daytime can be made possible. In the above described explanation, FIG. 6 shows the state where the shutter opening is determined in response to the photographing distance and FIG. 7 shows the state where the shutter opening is determined in response to the brightness of the object to be photographed. In this case, the time of flashing of the flashing device will coincide with the time of beginning the closing operation of the shutter blade 14 but the shutter opening will invariably become the smaller diaphragm aperture of the diaphragm apertures to be determined by the brightness of the object to be photographed or the photographing distance. The displacement of the flash opening regulating lever 22 can be made to be controlled not only by the distance information but also by the compound information of the guide number information and/or film sensitivity information. Further, in the controlling circuit in FIG. 19, if the variable resistor 119 is varied, the potential of the nonreversing input terminal (+) of the amplifying circuit 104 will vary and the voltage of the output terminal will be able to be shifted. Therefore, such photographing information as the film sensitivity and/or F value can be electrically introduced by the variable resistor 119.

Figure 20:
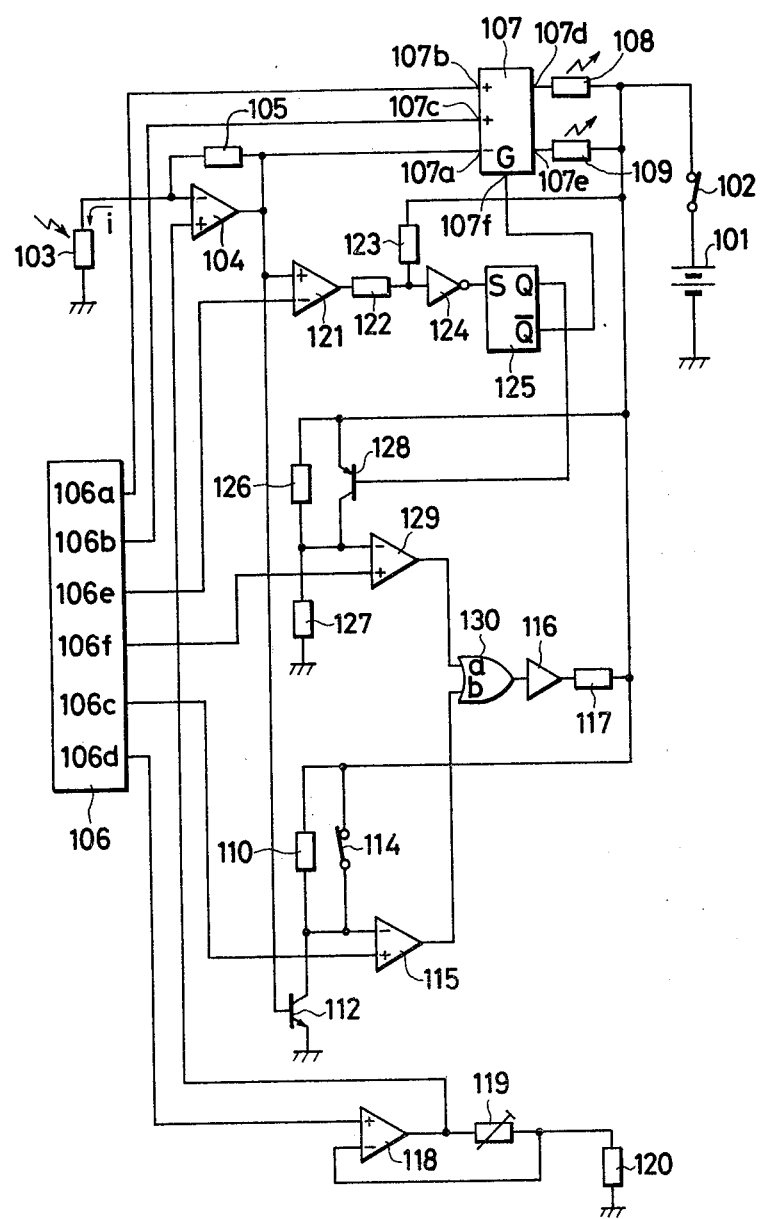

Next, the shutter controlling circuit in which the circuit for preventing the mis-indication of the exposure warning and the maximum exposure time regulating circuit are incorporated shall be described with reference to FIG. 20. Reference numeral 121 indicates a comparator in which the nonreversing input terminal (+) is connected to the output terminal of the amplifying circuit 104 and the reversing input terminal (−) is connected to the output terminal 106e of the reference voltage circuit 106. Reference numerals 122, 123 and 124 indicate respectively a capacitor, resistor and inverter forming a differentiating circuit. The capacitor 122 is connected at one end to the output terminal of the inverter 124. The resistor 123 is connected at one end to the plus pole of the current source battery 101 through the current source switch 102. Reference numeral 125 indicates a latch circuit in which such circuit as a flip-flop circuit is used, a setting input end (S) is connected to the output terminal of the inverter 124 forming the differentiating circuit and a reversing output terminal ($\bar{Q}$) is connected to the gate input terminal (G) 107f of the window comparator 107. Reference numerals 126 and 127 indicate a capacitor and resistor forming a delaying circuit for regulating the maximum exposure time. The capacitor 126 is connected at one end to the plus pole of the current source battery 101 through the current source switch 102. The resistor 127 is earthed at one end. Reference numeral 128 indicates a transistor which is connected in parallel with the capacitor 126 and is connected at the base to the nonreversing output terminal (Q) of the latch circuit 125. 129 indicates a converter in which the reversing input terminal (−) is connected to the joint of the capacitor 126 and resistor 127 and the nonreversing input terminal (+) is connected to the output terminal 106f of the reference voltage circuit 106. 130 indicates an OR gate in which one input terminal a is connected to the output terminal of the comparator 129, the other input terminal b is connected to the output terminal of the comparator 115 and the output terminal is connected to one end of the electromagnet 117 through the amplifying circuit 116.

The operation of this embodiment shall be described in the following. Just before the beginning of the opening operation of the above described shutter blade 14, the light receiving element 103 will be once shielded from the light of the field to be photographed. This state is the same as of the camera-shake warning. In the shutter controlling circuit in FIG. 19, the LED 109 will be lighted to make a mis-indication. But, in the circuit of this embodiment, when the output voltage of the amplifying circuit 104 becomes a voltage corresponding to a dark current generated when no light is incident upon the light receiving element 103, the potential of the nonreversing input terminal (+) of the comparator 121 will become lower than than the potential of the nonreversing input terminal (+) given by the output terminal 106e of the reference voltage circuit 106 and therefore the output terminal of the comparator 121 will reverse to the L level from the H level. By this reversal, a negative differentiating pulse will be generated by the differentiating circuit. As a result, a positive pulse will be generated at the output terminal of the inverter 124, the latch circuit 125 will be set and the reversing output terminal ($\bar{Q}$) will reverse to the "L" level from the "H" level. The signal of this "L" level will be given to the gate input terminal (G) of the window comparator 107, therefore both output terminals 107d and 107e of the comparator 107 will be placed on the "H" level and the LED's 108 and 109 will be no longer able to be lighted. On the other hand, when the nonreversing output terminal (Q) is reversed to the "H" level by setting the latch circuit 125, the transistor 128 will be interrupted and therefore the capacitor 127 will be charged in response to the value of the resistor 127. In the initial state, both output terminals of the comparators 115 and 129 will be on the "L" level, the output terminal of the OR gate 130 will be on the "L" level and therefore the electromagnet 117 will be excited. However, when the output terminal of one comparator 115 or 129 is reversed to the "H" level by the interruption of the transistor 128 and the opening of the switch 114 by the above described operation, the output terminal of the OR gate 130 will reverse to the "H" level, the electromagnet 117 will be demagnetized and then the shutter blade 14 will be closed. That is to say, the maximum exposure time will be regulated by the delay time by the capacitor 126 and resistor 127 and will be able to be set, for example, to be 10 seconds or to be 1/30 or 1/15 second so as to cause no camera-shake. If the resistor 127 is made a variable resistor or a resistor of a type wherein a plurality of resistors of different resistance values are switched to be used, it will be more effective. When the maximum long time is set to be 1/30 or 1/15 second, a shutter controlling circuit effective even at the time of flash photographing will be able to be made.

Figure 21:
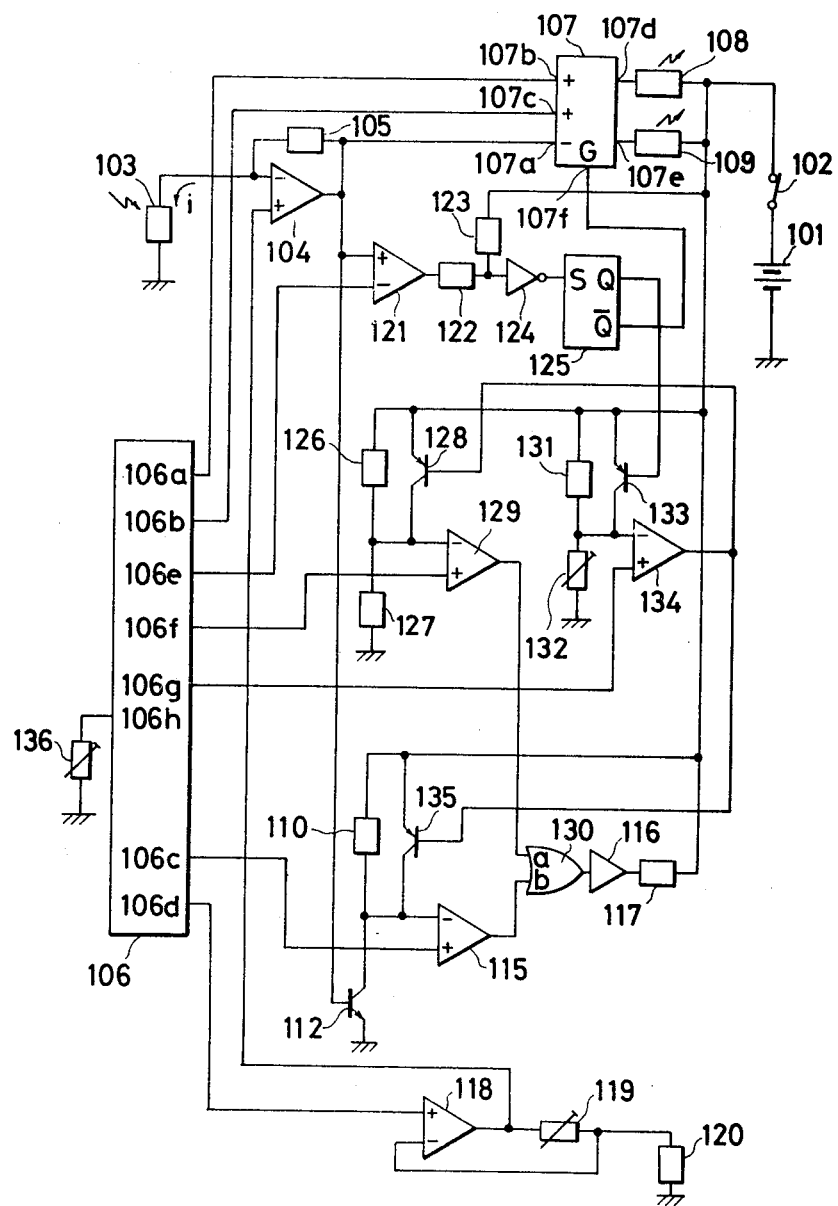

A shutter controlling circuit wherein the beginning of the exposure time measurement is also electrically controlled shall be described in the following with reference to FIG. 21. Reference numerals 131 and 132 indicate respectively a capacitor and variable resistor for forming a delaying circuit for adjusting the time of beginning the exposure time measurement. The capacitor 131 is connected at one end to the plus pole of the current source battery 101 through the current source switch 102. The variable resistor 132 is earthed at one end. Reference numeral 133 indicates a transistor connected in parallel with the capacitor 131 and connected at the base to the reversing output terminal (Q) of the latch circuit 125. 134 indicates a comparator in which the reversing input terminal (−) is connected to the joint of the capacitor 131 and variable resistor 132 and the nonreversing input terminal (+) is connected to the output terminal 106g of the reference voltage circuit 106. Reference numeral 135 indicates a transistor connected in parallel with the capacitor 110 instead of the switch 114 in FIGS. 19 and 20 and connected at the base to the output terminal of the comparator 134 together with the base of the transistor 128. 136 indicates a variable resistor which is connected at one end to the input terminal 106h capable of adjusting the voltage of the output terminal 106g of the reference voltage circuit 106 and is earthed at the other end. In the initial stage of the shutter release, the reversing output terminal (Q) of the latch circuit 125 will be on the "L" level and the transistor 133 will conduct. Therefore, in the comparator 134, the reversing input terminal (−) will be on the "H" level, the output terminal will be placed on the "L" level and both transistors 128 and 135 will conduct. When the latch circuit 125 is set as described above and its reversing output terminal (Q) reverses to the "H" level, the transistor 133 will be interrupted and therefore the capacitor 131 will begin to be charged in response to the value of the variable resistor 132. When the potential of the reversing input terminal (−) of the comparator 134 becomes lower than the potential of its nonreversing input terminal (+) given by the output terminal 106g of the reference voltage circuit 106, the comparator 134 will reverse and its output terminal will be on the "H" level. As a result, the transistors 128 and 135 will be interrupted, the regulation of the maximum exposure time and the measurement of the exposure time will be started and the subsequent operation will be the same as in the case of the shutter controlling circuit described with reference to FIG. 20. Therefore, by setting the variable resistor 132 to vary the time until the comparator 134 reverses, the mechanical delay time until the shutter blade actually closes from the time when the electric signal for closing the shutter blade is generated can be adjusted easily and properly. Further, the same adjustment can be made also by varying the reference voltage of the nonreversing input terminal (+) of the comparator 134 by replacing the variable resitor 132 connected to the reversing input terminal (−) of the comparator 134 with a resistor having a constant resistance value and adjusting the resistance value of the variable resistor 136.

The operation of the shutter according to the present invention including a self-timer device shall be explained in the following with reference to FIGS. 11 to 14 and 22. In this case, on the closing drive plate 4, a hook 4h is further formed and a pin 4i is erected. On the armature lever 15, a bend 15d is formed instead of the pin 15c and is engaged with the arm 19b of the holding lever 19 on one side. Reference numeral 25 indicates a timer lever which is borne on the shaft 16, has a bend 25a engageable with the hook 4h and an arm 25b engaged with the other side surface of the bend 15d and is biased counterclockwise by a spring 26 somewhat stronger than the spring 20. As a result, in the initial stage of the shutter release, the armature lever 15 will be rotated counterclockwise and the electromagnet 117 will be excited but the armature 17 will not be attracted and will be separated from the electromagnet 117. The electromagnet 117 is connected at one end of the winding to the output terminal 115a of the comparator 115 through the resistor 137 instead of the amplifying circuit 116. Accordingly, as only a small current restricted by the resistor 117 will flow when the current source switch is closed, the magnetic force will be weak. Reference numerals 138 and 139 indicate respectively a resistor and capacitor forming a delaying circuit for the self-timer. The resistor 138 is connected at one end to the plus pole of the current source battery 101 through the current source switch 102. The capacitor 139 is earthed at one end. Reference numeral 140 indicates a switch which is to start the operation of the above mentioned delaying circuit, is connected in parallel with the capacitor 139 and is opened and closed by the pin 4i of the closing drive plate 4. 141 indicates a switch for switching to set and reset the self-timer. 142 indicates a resistor connected in series to the switch 141 and very small in the resistance value. This series circuit is connected in parallel with the resistor 138. Reference numeral 143 indicates a comparator in which the reversing input terminal (−) is connected to the output terminal 106i of the reference voltage circuit 106 and the nonreversing input terminal (+) is connected to the joint of the resistor 138 and capacitor 139. Reference numerals 144, 145 and 146 indicate respectively a capacitor, resistor and inverter for forming a differentiating circuit. The capacitor 144 is connected at one end to the output terminal 143a of the comparator 143. One end of the resistor 145 is earthed. 148 indicates a current amplifying circuit in which the input terminal is connected to the output terminal of the inverter 146 and the output terminal is connected to one end of the electromagnet 117. 149 indicates a NAND gate in which the input terminal is connected to the nonreversing output terminals 115b and 143b respectively of the comparators 115 and 143. Reference numerals 150, 151 and 152 indicate respectively a capacitor, resistor and inverter for forming a differentiating circuit. The capacitor 150 is connected at one end to the output terminal of the NAND gate 149. The resistor 151 is connected at one end to the plus pole of the current source battery 101 through the current source switch 102. Reference numeral 153 indicates an "SCR" in which the gate is connected with the output terminal of the inverter 152 and is earthed through the resistor 154 and the cathode is earthed. 155 indicates a trigger circuit of an electroflash device connected between the anode and cathode of the "SCR" 153.

The operation of this embodiment shall be explained in the following.

Figure 13:
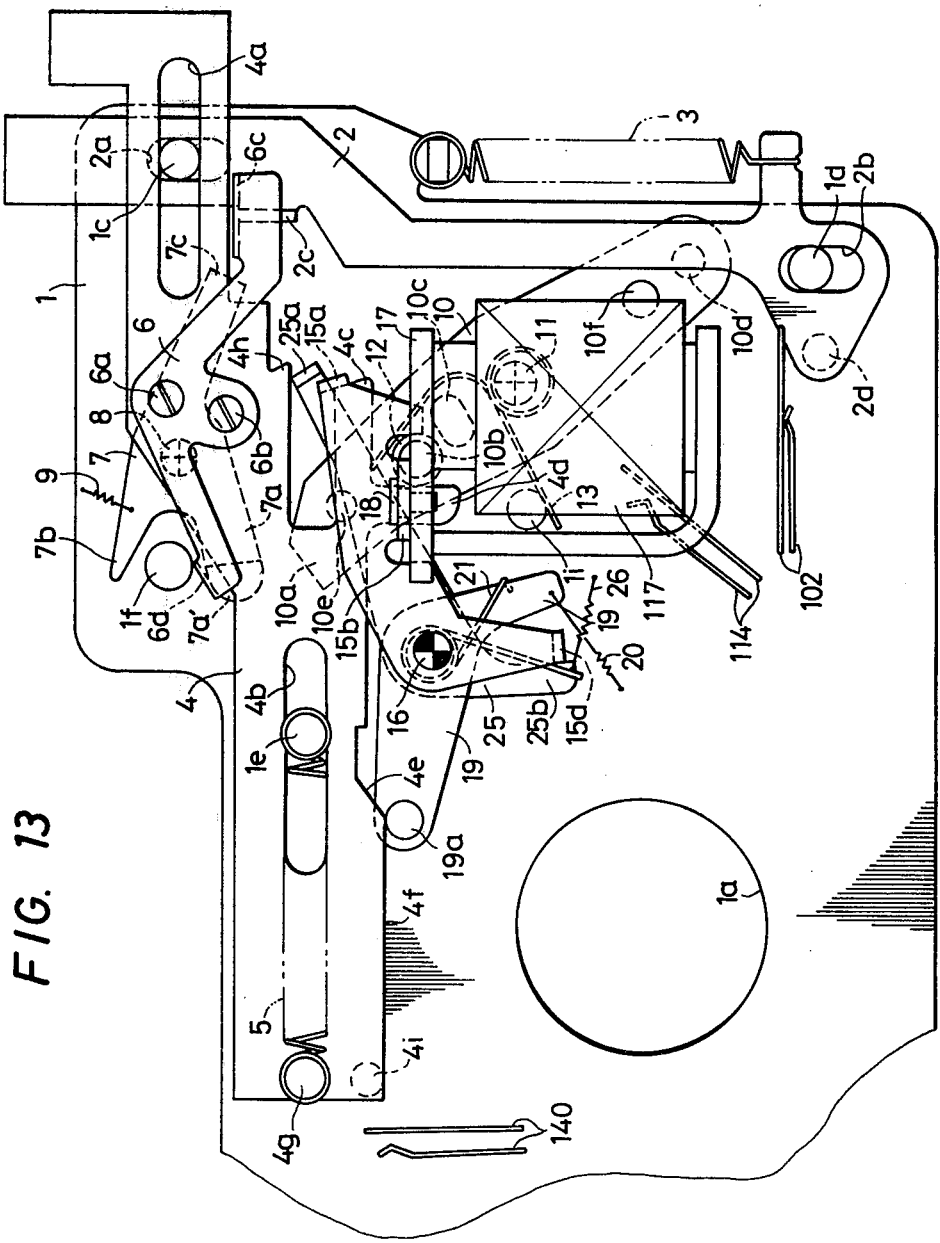
FIG. 13 is an elevational view in the case that the shutter device shown in FIG. 11 is opened.
Figure 14:
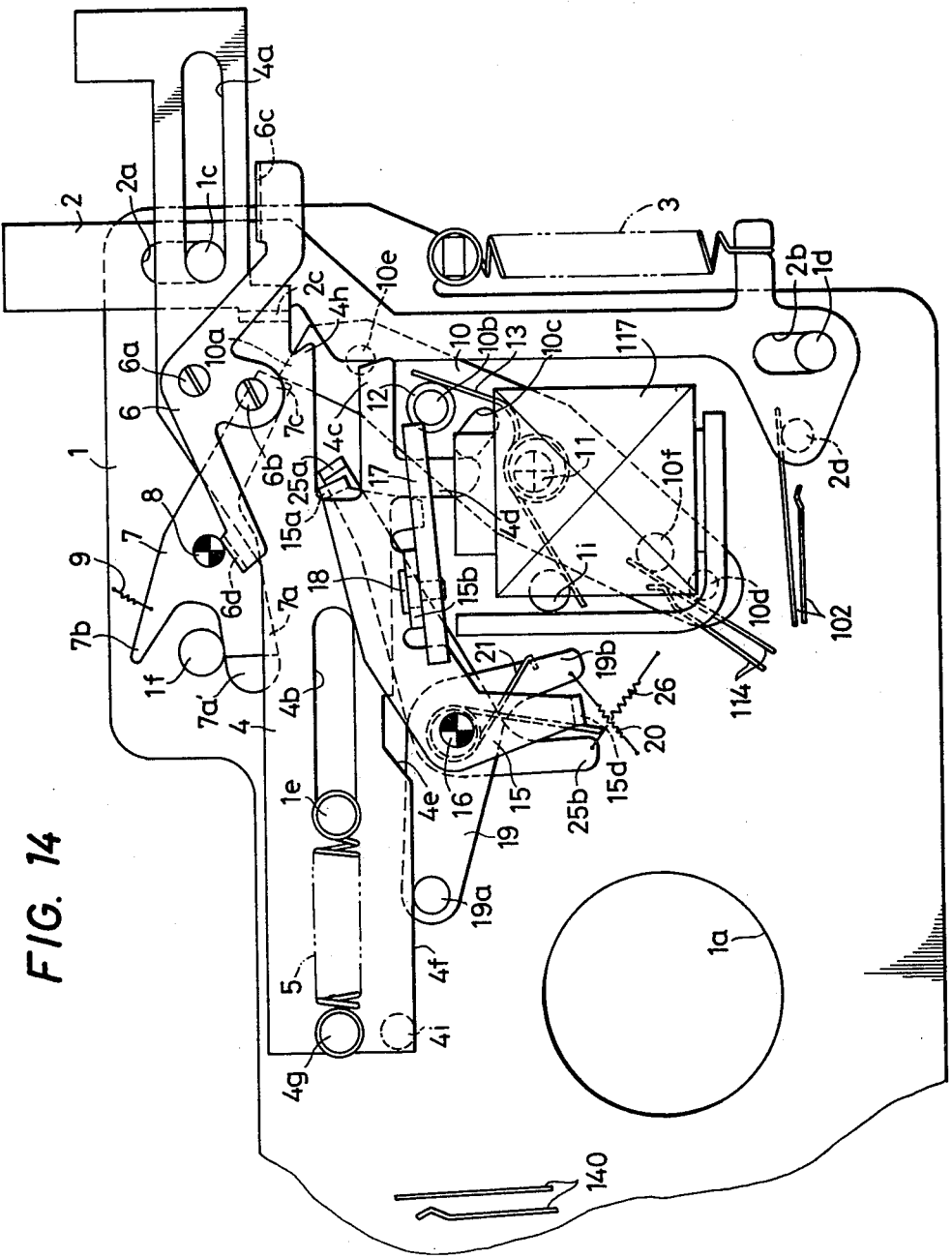
FIG. 14 is an elevational view showing the shutter device shown in FIG. 11 as the exposure ends.

In the case of photographing by using the self-timer, a dial set, for example, on the camera body not illustrated is rotated to the self-timer position and open the switch 141. With the operation of the release lever 2, the closing drive plate 4 will move rightward but will be once stopped in the position in which the hook 4h is locked by the bend 25a of the timer lever 25. By the displacement of the pin 4i with this movement of the closing drive plate 4, the switch 140 will be opened and the capacitor 139 will begin to be charged through the resistor 138. In this state, too, the return of the release lever 2 will be prevented and the current source switch 102 will be kept closed. With the progress of the charging of the capacitor 139, after the lapse of the self-timer operating time, for example of 10 seconds, the potential of the nonreversing input terminal (+) of the comparator 143 will become higher than the potential of its reversing input terminal (−) given from the output terminal 106i of the reference voltage circuit 106, the comparator 143 will reverse and the output terminal 143a will be on the "H" level. As a result, a positive differentiating pulse will be generated at the connecting point of the capacitor 145 and resistor 145 and a negative pulse will be generated at the output terminal of the inverter 146. Therefore, a negative pulse will be given to the electromagnet 117 through the current amplifying circuit 148, then a large current will be made to flow instantaneously through the electromagnet 117, the magnetic force will increase to attract the armature 17 and the armature lever 15 and timer lever 25 will be rotated clockwise against the tension of the spring 26. After the armature 17 has been attracted, the current to be supplied to the electromagnet 117 becomes small due to the disappearance of the pulse. However, the electromagnet 117 can hold the armature 17 in the attracted position. The subsequent operation process is as shown in FIGS. 13 and 14. The operation order is the same as is described with reference to FIGS. 3 and 4 and therefore shall not be explained in detail here.

At the time of ordinary photographing without using a self-timer, the switch 141 will be closed, the resistor 142 of a small resistance value will be connected in parallel with the resistor 138 as a result and therefore the resistance value of the resistor to be connected to the nonreversing input terminal of the comparator 143 will be smaller than in the case of only the resistor 138. Therefore, the delay time determined by the resistors 138 and 142 and capacitor 139 will become very short and the operation of opening and closing the shutter will be made substantially simultaneously with the operation of the release lever 2. By the way, in this case, the delay time can be made 0 but there is an advantage that, by selecting the delay time to be of a proper value, there can be obtained an accomodation corresponding to the time required to complete the operation of the mirror and/or automatic diaphragm mechanism in a single-lens reflex camera or the operation of the adjusting mechanism in a camera provided with an automatic focus adjusting mechanism.

Further, in this shutter mechanism, too, the same as in the above described case, a flash synchronizing switch is formed of the arm 4d of the closing drive plate 4 and the conducting ring 12 on the opening and closing lever 10. In this shutter controlling circuit, an electric flash synchronizing switch is also incorporated. That is to say, when the comparator 143 reverses at the time when the operation of the self-timer is completed, one input terminal of the NAND gate 149 will be on the "H" level due to the nonreversing output terminal 143b and the gate will be ready to be closed. When the comparator 115 reverses at the time when the shutter blade 14 is closed, the other input terminal of the NAND gate 149 will be also on the "H" level due to the nonreversing output terminal 115b, as a result, the gate 149 will be closed and the output terminal will be on the "L" level. Therefore, at the same time as a positive differentiating pulse is given to the gate by the differentiating circuit, the SCR 153 will conduct and will drive the trigger circuit 155. When the shutter blade 14 reaches the maximum opening position, the electroflash will be able to be flashed. Further, not only the signal of the output terminal 143b of the comparator 143 as in this embodiment but also the signal generated in response to the shutter opening time by utilizing such latch circuit 125 as in FIG. 20 and providing another nonreversing output terminal may be utilized for one input signal of the NAND gate 149.

Figure 22:
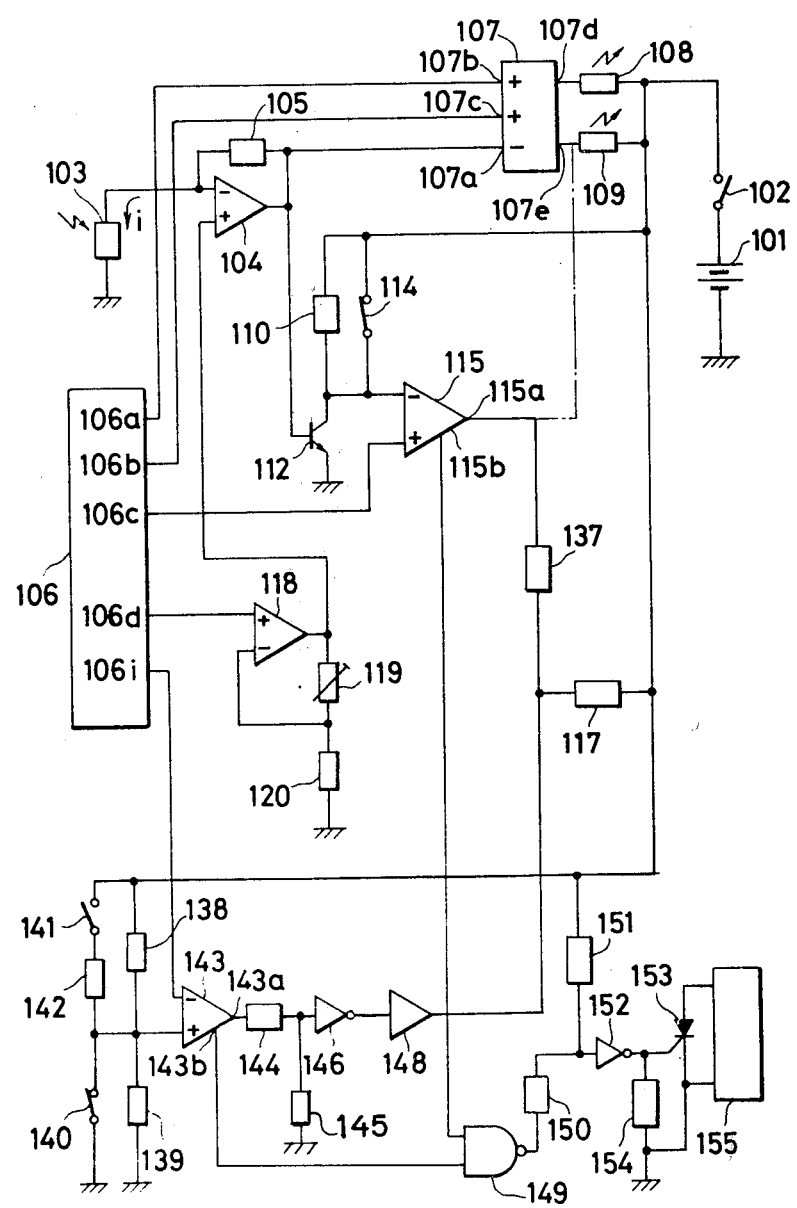
Figure 23:
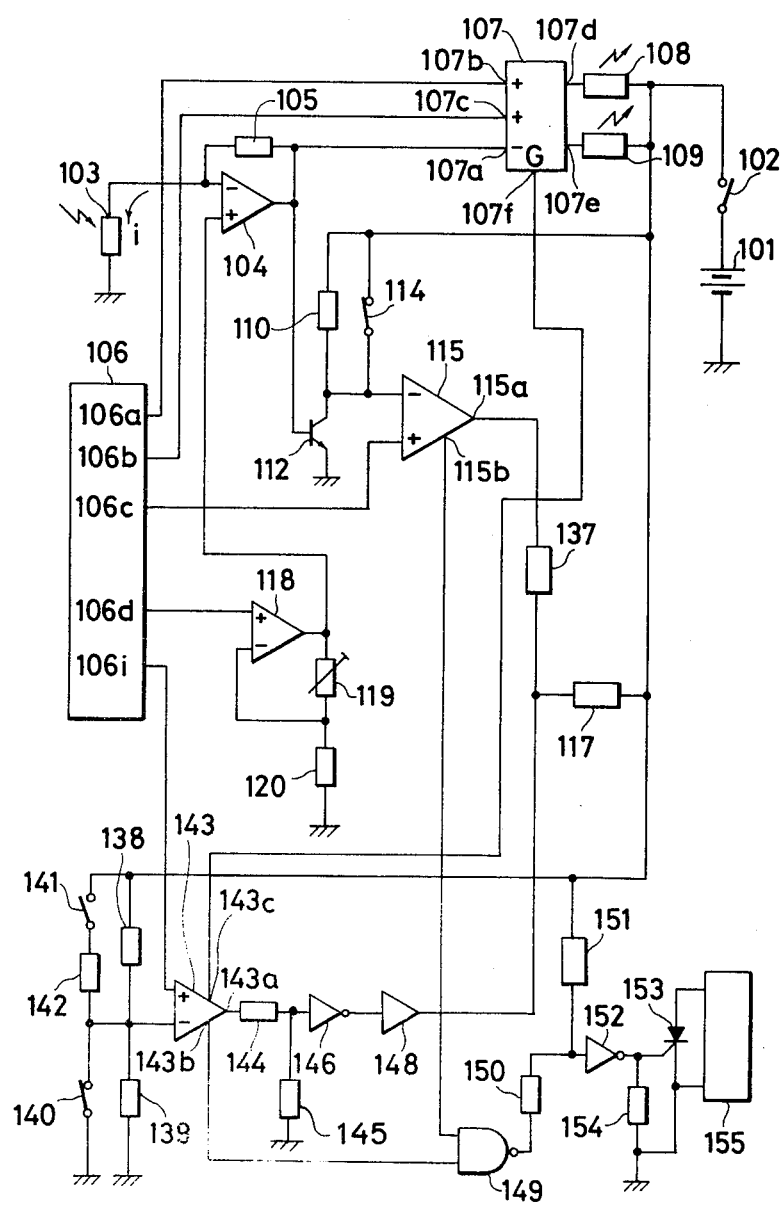

FIG. 23 shows an embodiment of the shutter controlling circuit wherein a circuit for preventing the misindication of an exposure warning is incorporated in the circuit of FIG. 22. Here the gate input terminal (G) 107f of the window comparator 107 is made to be controlled by the reversing output terminal 143c of the comparator 143.

Figure 24:
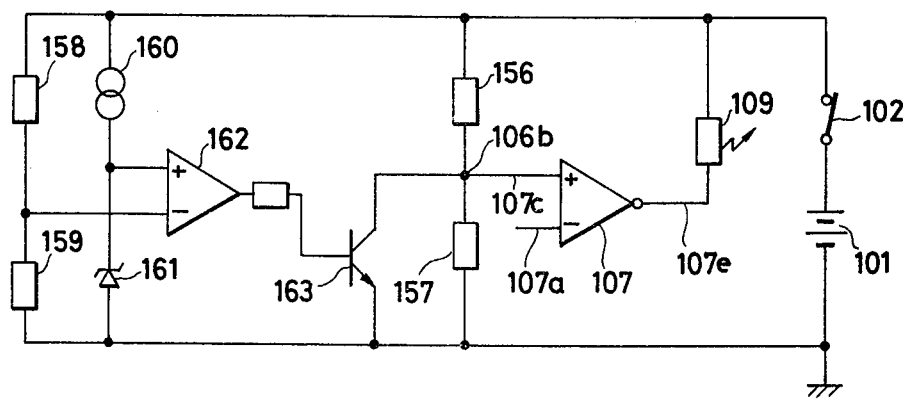
FIG. 24 is a wiring diagram showing an example of battery checking circuit.

Further, FIG. 24 shows an embodiment wherein a battery checking circuit is formed by using a camera-shake warning circuit. Here reference numerals 156 and 157 indicate resistors forming a voltage dividing circuit and briefly showing a circuit giving a reference voltage for the camera-shake warning by the output terminal 106b of the reference voltage circuit 106. Reference numerals 158 and 159 indicate resistors forming a voltage dividing circuit and serving to detect the voltage of the current source battery 101. Reference numeral 160 and 161 indicate respectively a constant current circuit and constant voltage diode used to set a checking level. 162 indicates a comparator in which the reversing input terminal (−) is connected to the joint of the resistors 158 and 159 and the nonreversing input terminal (+) is connected to the joint of the constant current circuit 160 and constant voltage diode 161. 163 indicates a transistor in which the base is connected to the output terminal of the comparator 162 and the resistor 157 is connected between the collector and emitter. When the voltage of the current source battery 101 is above the checking level, as the potential of the reversing input terminal (−) is higher than the potential of the nonreversing input terminal (+) in the comparator 162, its output terminal will be "L" and will intercept the transistor 163. Therefore, the battery checking circuit part will be independent of the camera-shake warning circuit. On the other hand, when the voltage of the current source battery 101 is below the checking level, the output of the comparator 162 will be on the "H" level and therefore the transistor 163 will conduct. As a result, in the window comparator 107, the nonreversing input terminal (+) will be of the potential of the minus pole of the current source battery, the output terminal 107e will be on the "H" level and the LED 109 will become unable to be lighted. Therefore, while the current source switch 102 is closed, when the incident light to the light receiving element 103 is shielded, if the LED 109 lights, the voltage of the current source battery 101 will be above the checking level but, if it does not light, the voltage will be indicated to be below the checking level.

Figure 15:
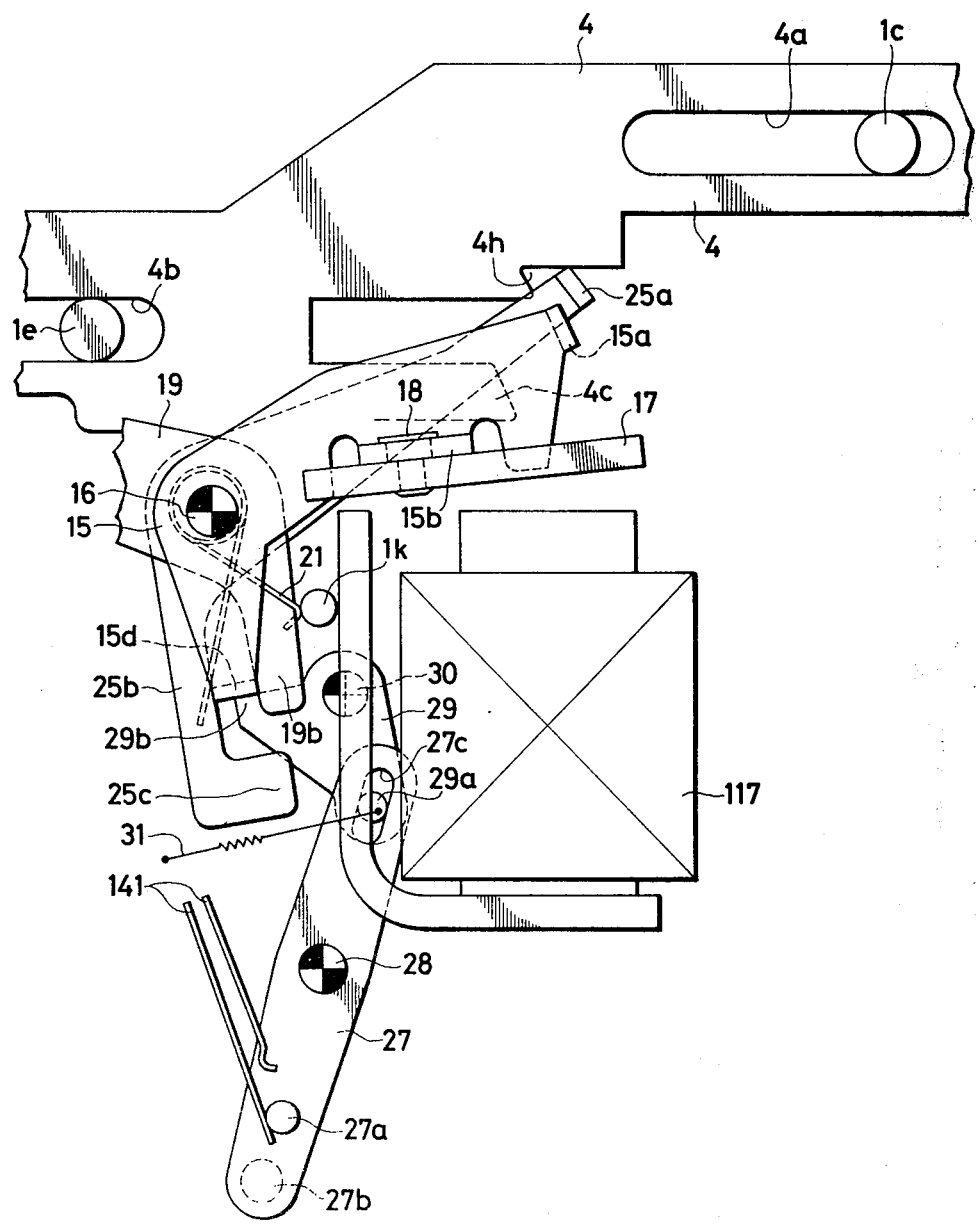
FIG. 15 is a fragmental elevational view in the case that the self-timer mechanism is set.

Now, an embodiment wherein the self-timer mechanism is so formed as to be reset after one exposure operation shall be explained with reference to FIGS. 15 and 16. A pin 1K is further erected on the shutter plate 1. A projection 25 is further formed on the timer lever 25. Reference numeral 27 indicates a timer setting lever which is borne on a shaft 28, has pins 27a and 27b for opening and closing the switch 141 erected on it and forms a slot 27c. 29 indicates a timer setting lever which is borne on a shaft 30, is fitted to the slot 27c, has a pin 29a engageable with the projection 25c erected on it, forms an arm 29b engageable with the back part of the bend 15d of the armature lever 15 and is biased clockwise by a spring 31 stronger than the spring 26 (See FIG. 11). FIG. 15 shows the self-timer as set. When the armature 17 is attracted by the electromagnet 117 and the armature lever 15 rotates clockwise to end the self-timer operation, the back part of the bend 15d will be disengaged from the arm 29d and therefore the resetting lever 29 will be rotated clockwise by the tension of the spring 31. By the clockwise rotation of the resetting lever 29, the setting lever 27 will be rotated counterclockwise through the pin 29a and the projection 25c will be pushed and moved to rotate the timer lever 25 clockwise against its habit. As a result, the respective elements will be as in FIG. 16, the switch 141 will be closed and the bend 25a of the timer lever 25 will be held in the position retreated from the moving track of the hook 4h of the closing drive plate 4.

Figure 16:
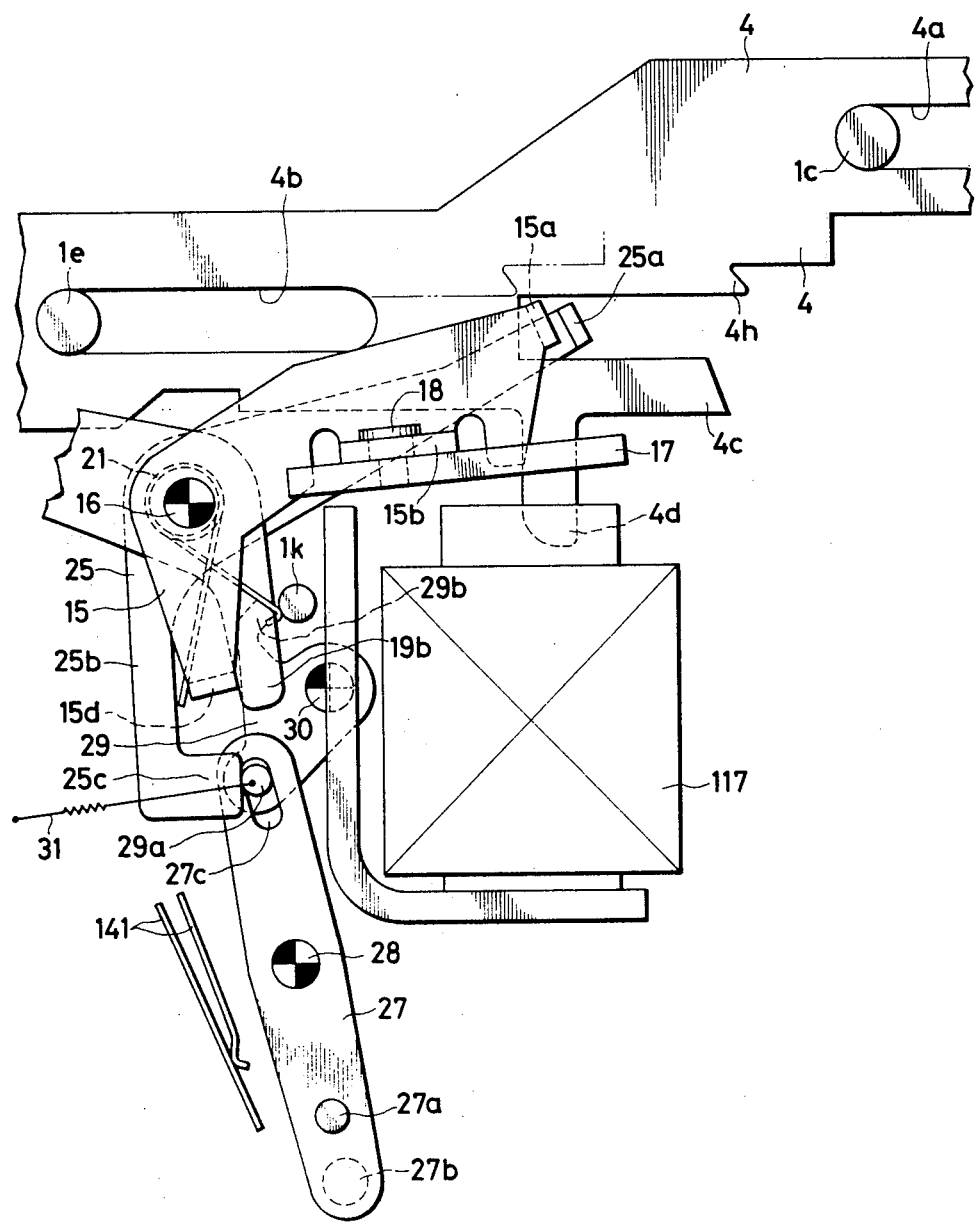
FIG. 16 is a fragmental elevational view in the case that the self-timer mechanism is reset.

The self-timer mechanism will be set when the setting lever 27 is rotated clockwise by a setting member not illustrated from the state in FIG. 16. That is to say, when the resetting lever 29 is rotated counterclockwise against the tension of the spring 31 by the clockwise rotation of the setting lever 27, the back part of the arm 29b engages with the side surface of the bend 15d and the arm 29b rides over the bend 15d while rotating the armature lever 15 conterclockwise, the state in FIG. 15 will be made and the setting will be completed. In this embodiment, the exposure time and self-timer are controlled with one electromagnet. However, separate electromagnets may be used. By the way, when the above described resetting mechanism is incorporated, in case the armature lever 15 is attracted by the electromagnet 117, the load rotating the timer lever 25 clockwise will be reduced and therefore the attracting operation will be more positive.

Figure 17:
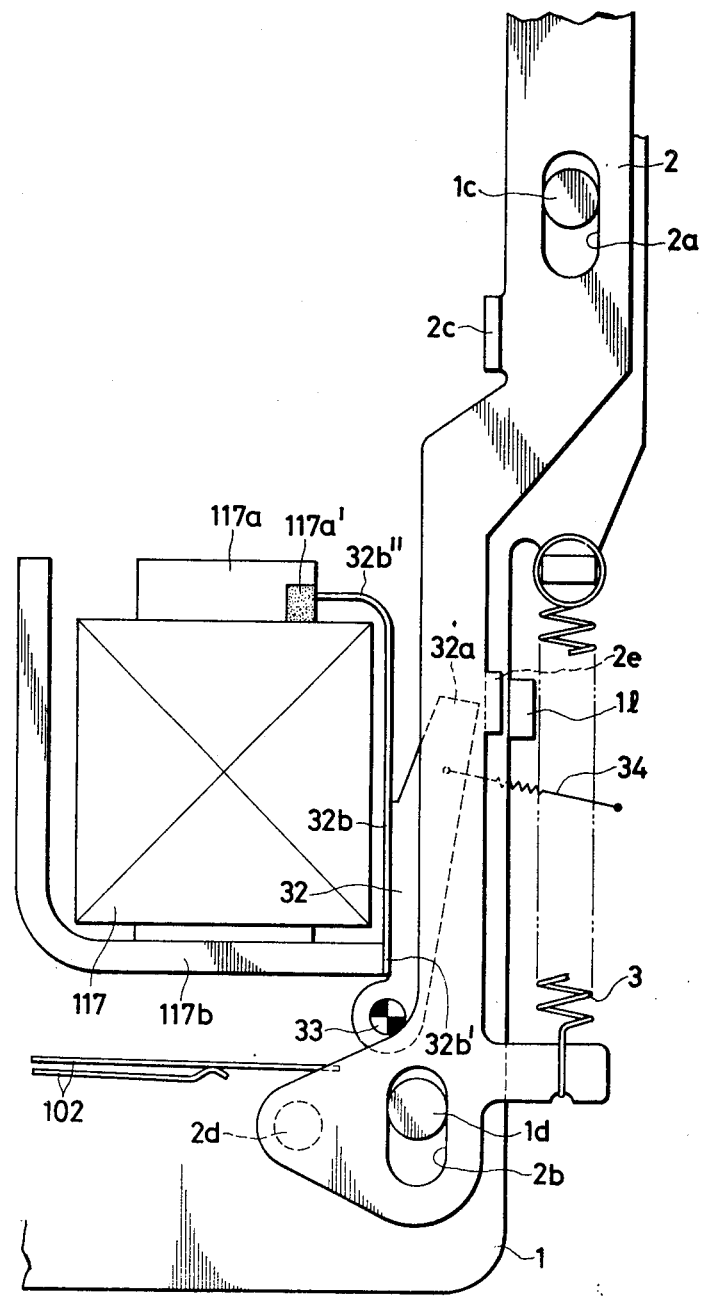
FIG. 17 is a fragmental elevational view in the case that the release locking mechanism is inoperative.
Figure 18:
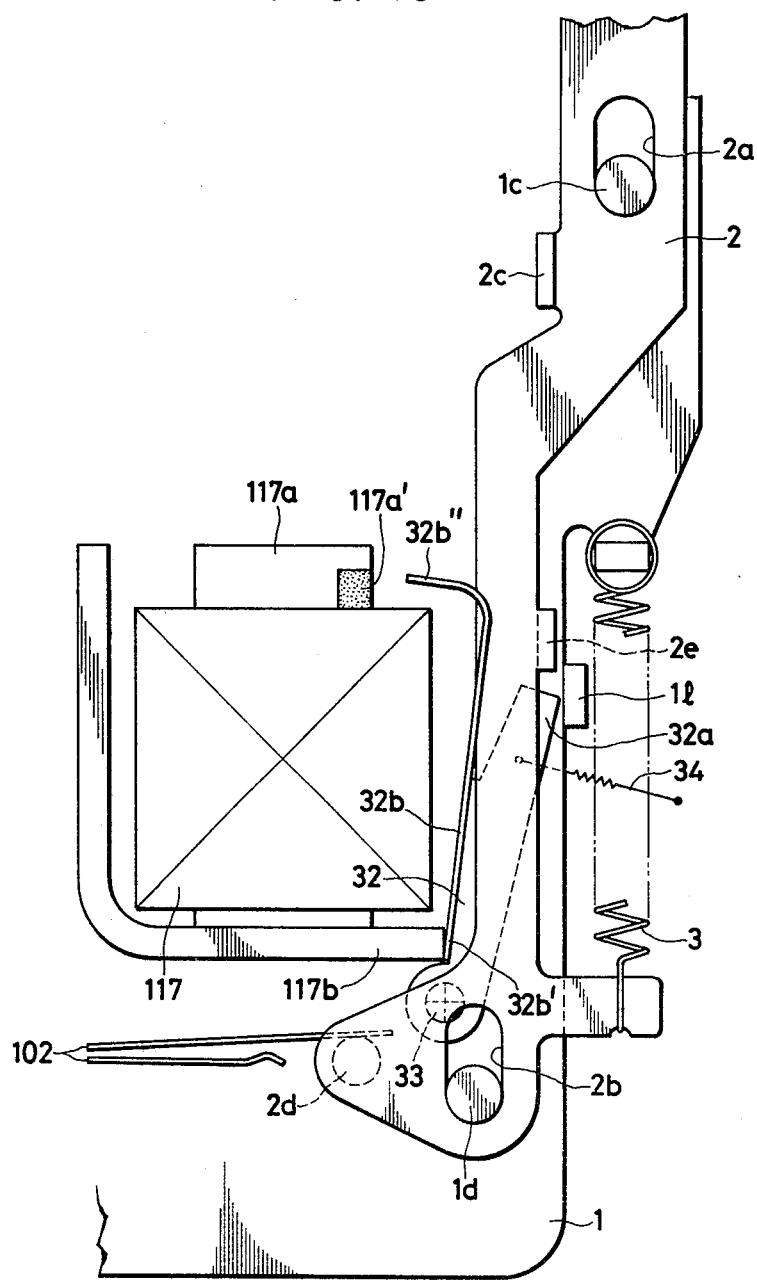
FIG. 18 is a fragmental elevational view in the case that the releasing locking mechanism is in operation.

Next, the release locking mechanism in the case that the voltage of the current source battery 101 is below the rated value shall be explained with reference to FIGS. 17 and 18. A bend 1*l* as a stopper is further formed on the shutter plate 1. A bend 2*e* is further formed on the release lever 2. Reference numeral 32 indicates a release locking lever which is borne on a shaft 33, can contact the bend 1*l* and forms an arm 32*a* capable of being present within the moving track of the bend 2*e* and a bend 32*b* related with the electromagnet 117, has the base portion 32*b*' of the bend 32*b* engaged with one end of the yoke 117*b* of the electromagnet 117, has the bent portion 32*b*" opposed to the side surface of the core 117*a* and is biased clockwise by a weak spring 34.

The operation of this embodiment shall be explained in the following.

When the release lever 2 is pushed down, as described above, the current source switch 102 will be closed and a voltage will be fed to the respective parts of the circuit. In the initial state, as the switch 114 (See FIG. 1) is closed, a low current will flow to the electromagnet 117 through the resistor 137 (See FIG. 22) and the electromagnet 117 will be excited. The magnetic force generated in the electromagnet 117 at this time will be so small as not to attract the armature 17. On the other hand, the locking lever 32 will form a magnetic circuit of the bend 32*b*, bent part 32*b*"', core 117*a*, yoke 117*b* and base portion 32*b*' for the electromagnet 117 and will be rotated counterclockwise when an attraction capable of overcoming the weak spring 34 is given by the electromagnet 117. Therefore, at the time of the shutter release, if it is sensed whether the locking lever 32 rotates counterclockwise or not, it will be able to be judged whether the current source battery 101 is the usable condition or not. When the voltage of the current source battery 101 is sufficient and a current above a predetermined level flows through the electromagnet 117, the locking lever 32 will rotate counterclockwise as described above, the arm 32*a* will retreat from the moving track of the bend 2*e* as shown in FIG. 17 and therefore the release lever 2 will be able to be further pushed down. When the current flowing through the electromagnet 117 is below the predetermined level, as shown in FIG. 18, the locking lever 32 will remain to have the arm 32*a* in contact with the bend 1*l*, the arm 32*a* will remain present within the moving track of the bend 2*e* and therefore the release lever 2 will be no longer able to be further pushed down. Further, if a nonmagnetic body portion 117*a*' is provided in the part opposed to the bent portion 32*b*" of the bend 32*b*, an air gap will be made within the above mentioned magnetic circuit, the magnetic flux passing through the magnetic path will reduce and therefore the reduction of the magnetic flux later attracting the armature will be able to be made low.

By the way, if the output terminal 107*e* of the window comparator 107 is connected also to the output terminal 115*a* of the comparator 115 as shown by the chain line in FIG. 22, the release will be able to be locked simultaneously with the camera-shake warning. Also, the locking lever 32 can be borne on the release lever 2. In this case, depending on whether the locking lever 32 is attracted by the electromagnet 117 or not, a part of the locking lever 32 will not be locked or will be able to be locked with a fixed member not illustrated. Here, in case the locking lever 32 is attracted by the electromagnet 117, the bent portion 32*b*" will move to slide on the core 117*a* as the release lever 2 is pushed down. However, if the bent portion 32*b*" is made to be finally opposed to the nonmagnetic body portion 117*a*', the same effect as is described above will be obtained. Further, in case the current source for the shutter controlling circuit is used also to charge the main capacitor of the flashing device in a camera having a flashing device built in, the current source voltage will drop while charging the main capacitor and therefore the release locking mechanism will operate the same as is described above.

We claim:

1. A program type electric shutter comprising a shutter plate having an exposure aperture and light receiving window thereon, shutter blades which are also diaphragm blades and are movably supported respectively on said shutter plate and have each shutter opening able to open and close said exposure aperture, a first opening formed on said each shutter blade and aligned with said light receiving window in the normal state, a second opening which is formed adjacently to said first opening on said each shutter blade and can open said light receiving window in response to the variation of the opening area of said exposure aperture, a light receiving element arranged as aligned with said light receiving window, an exposure warning indicating means connected to said light receiving element, and a latch circuit connected between said exposure warning indicating means and light receiving element, said exposure warning indicating device being held to be inoperative by an electric signal issued from said latch circuit at the moment when said first opening retreats from said light receiving window with respect to the opening motion of said shutter blade by the shutter release.

2. A program type electric shutter comprising a shutter plate having an exposure aperture and light receiving window thereon, shutter blades which are also diaphragm blades and are movably supported respectively on said shutter plate and have each shutter opening able to open and close said exposure aperture, a first opening formed on said each shutter blade and aligned with said light receiving window in the normal state, a second opening which is formed adjacently to said first opening on said each shutter blade and can open said light receiving window in response to the variation of the opening area of said exposure aperture, a light receiving element arranged as aligned with said light receiving window, an exposure warning indicating means connected to said light receiving element, and a time delaying means which is connected to said exposure warning indicating means and can be made to begin to operate by the initial motion of the shutter release, the opening motion of said shutter blade being prevented by said time delaying means beginning to operate before said shutter blades start the opening motion, the opening motion of said shutter blades being started and said exposure warning indicating means being held to be inoperative by an electric signal issued from said delaying device when the operation of said time delaying means ends.

3. A program type electric shutter according to claim 2 wherein said time delaying means includes a switching means and can be used also as a self-timer by switching said switching means.

* * * * *